(12) United States Patent
Jain et al.

(10) Patent No.: US 9,045,933 B2
(45) Date of Patent: Jun. 2, 2015

(54) ENERGY-EFFICIENT SMART WINDOW SYSTEM

(75) Inventors: Kanti Jain, Urbana, IL (US); Linus Jang, Delmar, NY (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 1031 days.

(21) Appl. No.: 13/153,601

(22) Filed: Jun. 6, 2011

(65) Prior Publication Data
US 2012/0307352 A1 Dec. 6, 2012

(51) Int. Cl.
*G02B 27/42* (2006.01)
*E06B 9/24* (2006.01)

(52) U.S. Cl.
CPC .............. *E06B 9/24* (2013.01); *G02B 27/4277* (2013.01); *G02B 27/4294* (2013.01); *E06B 2009/2417* (2013.01)

(58) Field of Classification Search
CPC ........... G02B 27/4242; G02B 27/4277; G02B 27/4294; G02B 5/1866
USPC .................................. 359/558–576, 591–598
See application file for complete search history.

(56) References Cited

U.S. PATENT DOCUMENTS

| | | | |
|---|---|---|---|
| 4,639,091 A | 1/1987 | Huignard et al. | |
| 4,850,682 A | 7/1989 | Gerritsen | |
| 4,964,701 A | 10/1990 | Dorschner et al. | |
| 5,151,814 A | 9/1992 | Grinberg et al. | |
| 5,566,024 A | 10/1996 | Rauch | |
| 6,014,845 A | 1/2000 | Jain et al. | |
| 6,094,306 A | 7/2000 | Jain | |
| 6,172,792 B1 | 1/2001 | Jepsen et al. | |
| 6,404,553 B1 | 6/2002 | Wootton et al. | |
| 6,545,821 B2* | 4/2003 | Katsuma | 359/721 |
| 6,587,180 B2 | 7/2003 | Wang et al. | |
| 6,644,818 B2 | 11/2003 | Sloot | |
| 6,792,028 B2 | 9/2004 | Cook et al. | |
| 7,075,615 B2 | 7/2006 | Ishihara et al. | |
| 7,262,899 B2 | 8/2007 | Bigman | |
| 7,940,457 B2 | 5/2011 | Jain et al. | |
| 2001/0050815 A1 | 12/2001 | Ishihara et al. | |
| 2002/0015230 A1 | 2/2002 | Pilossof et al. | |
| 2005/0232530 A1 | 10/2005 | Kekas | |
| 2007/0036512 A1 | 2/2007 | Winston et al. | |
| 2008/0030836 A1 | 2/2008 | Tonar et al. | |

(Continued)

FOREIGN PATENT DOCUMENTS

EP 1 767 964 3/2007
WO WO 2009/146371 3/2009

OTHER PUBLICATIONS

Lampert, C.M.. (2001) "Progress in Switching Windows," *Solar Switch. Mater. Proc. SPIE* 4458:95-103.
International Search Report and Written Opinion, Corresponding to International Application No. PCT/US09/45474, Mailed Jul. 27, 2009.

(Continued)

*Primary Examiner* — Stephone B Allen
*Assistant Examiner* — Kimberly N Kakalec
(74) *Attorney, Agent, or Firm* — Lathrop & Gage LLP

(57) ABSTRACT

Energy-efficient windows incorporating spectrally selective optical elements capable of providing desirable optical characteristics (transmission, reflection, refraction or diffraction) for different wavelengths are disclosed herein. More specifically, energy-efficient windows incorporating suitably designed diffraction gratings to optimize the efficiency of the utilization of different spectral components of the solar radiation are disclosed.

20 Claims, 21 Drawing Sheets

(56) References Cited

U.S. PATENT DOCUMENTS

2009/0296188 A1 12/2009 Jain et al.
2011/0249345 A1* 10/2011 Nishiwaki et al. ............ 359/742

OTHER PUBLICATIONS

Wang et al. (Dec. 10, 2000) "Liquid-Crystal Blazed-Grating Beam Deflector," *Appl. Optics* 39(35):3545-3555.

* cited by examiner (a)

(b)

ENERGY-EFFICIENT SMART WINDOW SYSTEM

STATEMENT REGARDING FEDERALLY SPONSORED RESEARCH OR DEVELOPMENT

This invention was made in part with United States governmental support under Grant No. 0900542 awarded by the National Science Foundation. The U.S. government has certain rights in the invention.

CROSS REFERENCE TO RELATED APPLICATION

Not Applicable.

BACKGROUND

This invention is generally related to maximizing window efficiency and enabling control of the transmission of solar radiation into the interior of a building. This invention more specifically relates to advanced smart windows for high energy efficiency and recycling capability which include a diffraction grating for separation of different spectral regions for selective rejection and/or transmission of infrared, visible and ultraviolet radiation into the interior of a building.

This invention also relates to low-cost energy-efficient window technologies that incorporate a set of diffractive structures optimized to provide the desired objectives of a smart window. For example smart windows described herein are useful for lowering cooling costs in the summer season, lowering heating costs in the winter season, and lowering interior lighting costs throughout the year.

White light from the sun has a broad range of wavelengths. Among them, visible (VIS) rays with wavelengths ranging from about 0.4 µm to about 0.7 µm are always useful to humans, while infrared (IR) rays with wavelengths ranging from about 0.7 µm to about 3.0 µm are only useful for some seasons. Approximately 40% of total solar flux lies in the infrared spectral region and 40% in the visible, the remainder being distributed among wavelengths longer than 3 µm and shorter that 0.4 µm. In the summer season, it is frequently desired to reject the entry of solar heat into a building to reduce the building cooling costs, whereas in winter season it is desirable to permit the solar IR radiation to enter the building to reduce the heating costs. The function of conventional energy saving window technologies is currently confined to simply blocking the solar radiation (e.g., when the heat is not desired) without considering the wavelength of the incident light, so this leads to a need for extra interior lighting even in daylight hours.

From an optics perspective, conventional windows are classified as passive devices that function depending upon inherent characteristics of the glass and polymeric materials of which they are constructed. With conventional windows, mechanical methods are generally used to physically block direct solar radiation. Typical examples include awnings, louvers, blinds, etc. which usually have a fixed construction but can be made adjustable or retractable in response to changes in solar radiation direction. Louvers and blinds are typically composed of slats varying in size, width, and shape depending on the application. They are mainly intended for shading, but can also be used to redirect daylight, reduce glare, and control solar heat gain. Fixed mechanical systems are usually available at a low cost, but controllable mechanical systems can be more expensive. A major drawback is that mechanical methods typically block daylight when only heat-blocking is desired.

Passive optical methods have also been utilized for redirecting daylight, reducing glare, and controlling solar heat gain. Spectrally selective coatings applied to window glass typically reject a specific fraction of the solar spectrum, generally ultraviolet and infrared radiation, while admitting visible radiation. In this way, such a coating can allow visible light to be transmitted through a window, but blocks heat-generating ultraviolet and/or infrared radiation. Spectrally selective coatings are typically composed of thin metal films or a dielectric-metal multilayer stack which is coated or applied to the glass window. Such coatings can reduce solar heat gain, and thus directly benefit buildings situated in hot climates where the cooling load is a major energy cost. They can also be applied inside of a building to reduce heat loss through the windows in cold climates but will also block incoming heat from direct daylight, which is an important natural heating source. This technology, however, is not ideal for use in mixed climates because the coating property is fixed once it has been applied to the window.

A smart window, however, can be an active device which can control optical transmittance, for example by application of a set of electric signals. Various active window systems exist, all of which have major limitations. For example, one technical approach for smart windows is mainly limited to changing only one optical property, transmittance, for all ranges of wavelengths.

A photochromic window is one example of such a smart window. Photochromic windows experience a photochemical reaction under exposure to solar radiation in a specific spectral range, usually UV. This reaction changes the optical absorption band of the window, which is originally transparent to visible radiation, resulting in a change of color. The reaction can be reversed by eliminating the light source that has activated the transformation. The optical transparency is automatically varied with the intensity of the incident light. Such a window has the weakness that it can work only depending on the intensity of the external light, thereby not meeting seasonal requirements; for example, in summer months it blocks infrared radiation as well as useful visible light. Photochromic technology is widely known for its use in sunglass lenses.

Similarly, thermotropic or thermochromic windows change their optical properties in response to a temperature change. In general, they are transparent at lower temperatures and become translucent or opaque at higher temperatures. The basic mechanism is based on the movement of the component molecules to cause a phase change in the material, which scatter light accordingly. The major commercial applications of these materials are skylights and upper windows where visual comfort can be ignored.

Photochromic, thermotropic, and thermochromic windows are self-regulating, which make them less useful as energy saving devices since they can not be manually controlled to respond to the changing environment. Their optical properties can change when exposed to UV radiation and/or altered temperature. Photochromic materials will block heat on a sunny cold winter day, and thermotropic materials will block visible light on a warm summer day.

Active materials, such as those used in liquid crystal displays have an advantage over the use of photochromic and thermochromic materials in smart windows since they are electrically programmable and switchable. Commercially available liquid crystal displays are typically composed of two polarized glass substrates with a liquid crystal region between them and have transparent oxide electrodes. The first glass substrate is polarized in one direction and the second one is polarized in a perpendicular direction. In the off state, the liquid crystal molecules rotate the polarization of the light by 90 degrees, allowing incident light to pass through the two glass substrates without optical loss. When an electric field is applied, the liquid crystals will align and no longer rotate the polarization of the incident light; thus, the display will be opaque.

A polymer dispersed liquid crystal (PDLC) material is another useful liquid crystal system; however, the liquid crystal structure used in PDLC smart windows is somewhat different from that of a liquid crystal display. In a PDLC smart window, an emulsion of a polymer and liquid crystal is formed into a film. The refractive index of the polymer matrix is matched to the dispersed liquid crystal. The film is then sandwiched between two transparent sheets which are coated with a transparent conducting material, such as Indium Tin Oxide (ITO). In the off state, randomly oriented liquid crystals scatter light, making the film translucent. When an electric field is applied, the dispersed liquid crystals align parallel to the field and change the film's transparency. These windows are suitable for privacy windows, as they do not sacrifice light; however, they cannot efficiently block heat. The lack of a memory effect requires continuous power to hold the window in a transparent state; therefore, the power consumption is ultimately higher than that of other materials which only require power during switching.

Suspended particle system (SPS) windows utilize a similar concept as PDLC windows except that they use light absorbing microparticles instead of scattering liquid crystals to make the window opaque. SPS windows have an active polymer layer where the light absorbing microparticles are suspended. This layer is sandwiched between two sheets coated with transparent conductors, for example ITO, with a dielectric layer on top. In the off state, the suspended particles are randomly distributed and absorb light, making the film opaque. By applying an electric field to the active layer through the transparent conductors, the particles align to the field and change the transparency of the film. An application similar to SPS is electrophoretic electronic paper, also know as E-ink, which utilizes the migration of color coated suspended particles under the influence of an applied electric field. Since heat and light are both absorbed, the major application of SPS windows is shading, and illumination may be required inside a building, increasing energy use.

Electrochromic windows are among the most technologically advanced window systems. Instead of using suspended particles or liquid crystals, electrochromic materials are typically composed of a stack of an electrochromic layer, a conducting electrolyte layer, and an ion storage layer, all of which are placed between transparent conductors, such as ITO. They are transparent in the off state, and optical properties of the electrochromic layer can be changed by the injection of coloration ions from the storage layer. An applied electric field drives ions from the storage layer through the conducting layer to the electrochromic layer, altering the electronic structure of the electrochromic layer. This reaction switches the window from the transparent state to the opaque state. A reverse electric field will draw the coloration ions back into the storage layer switching the electrochromic layer back to its original clear state. Various coloration ions such as $Li^+$, $H^+$, $Na^+$, and $Ag^+$ can be utilized. Inorganic oxides such as $WO_3$, $NiO$, $V_2O_5$, and $MoO_3$ can be used for the electrochromic layer, among which $WO_3$ has been most widely studied. Electrochromic windows only consume power during switching, require a low driving voltage (1-5V) and have long term memory (12-48 h), making this technology energy efficient. However, fabrication of large area windows is very expensive (~$50-100/ft$^2$) and illumination is still required since the window absorbs or reflects the visible light.

Gasochromic materials share the principle of electrochromic materials except that the coloration ions are supplied by means of gas. Hydrogen ($H_2$) gas is typically injected between two panes, where one of the panes has a coating of a thin catalytic layer on top of a chromogenic layer, for example $WO_3$. Decoloration can be achieved by feeding another purging gas. The major drawback with this technique is the need of integration of gas lines into the window which is a large construction limitation.

U.S. Pat. No. 6,094,306 describes an energy-efficient window concept that utilizes multiple diffraction gratings that can be arranged in different ways to enable different cumulative angular deviations of the transmitted radiation. Although this technique is effective in providing angular discrimination between different configurations, it does not satisfactorily address the higher-order diffraction effects that result in wavelength mixing. U.S. Patent Application Publication No. US 2009/0296188 and U.S. Pat. No. 7,940,457, hereby incorporated by reference in their entireties, describe a smart window technology that utilizes a two-dimensional pixelated array of electro-optic active devices. While highly versatile in controllability, this technology also requires extensive and expensive microelectronic fabrication processes.

SUMMARY

Energy-efficient windows incorporating spectrally selective optical elements capable of providing desirable optical characteristics (transmission, reflection, refraction or diffraction) for different wavelengths are disclosed herein. More specifically, energy-efficient windows incorporating suitably designed diffraction gratings to optimize the efficiency of the utilization of different spectral components of the solar radiation are disclosed.

In one aspect, provided herein are smart windows. An embodiment of this aspect comprises a first blazed diffraction grating for diffracting visible electromagnetic radiation, the first blazed diffraction grating having a first blaze direction, a first grating pitch and a first blaze angle; and a second blazed diffraction grating for diffracting near-infrared electromagnetic radiation, the second blazed diffraction grating having a second blaze direction, a second grating pitch and a second blaze angle and positioned in optical communication with the first blazed diffraction grating for receiving electromagnetic radiation at least partially diffracted by the first blazed diffraction grating; and wherein the first grating pitch and the second grating pitch are different, wherein the first blaze angle and the second blaze angle are different and wherein the first blaze direction is oriented opposite to the second blaze direction.

In embodiments, the first grating pitch is smaller than the second grating pitch. Optionally, the first grating pitch is selected over the range of 1 µm to 3 µm. Optionally, the second grating pitch is selected over the range of 2 µm to 6 µm. In embodiments, the first blaze angle is smaller than the second blaze angle. Optionally, the first blaze angle is selected over the range of 20 to 35 degrees. Optionally, the second blaze angle is selected over the range of 25 to 40 degrees. In a specific embodiment, the first grating pitch and the first blaze angle provide for diffraction of visible electromagnetic radiation by the first diffraction grating. In an embodiment, the second grating pitch and the second blaze direction provide for diffraction of near-infrared electromagnetic radiation by the second diffraction grating.

In embodiments, a smart window further comprises a retroreflector positioned in optical communication with the second blazed diffraction grating for receiving electromagnetic radiation at least partially diffracted by the first blazed diffraction grating and/or at least partially diffracted by the second blazed diffraction grating. For example, in an embodiment, the retroreflector reflects near-infrared electromagnetic radiation, such as near-infrared electromagnetic radiation diffracted by the second blazed diffraction grating. In embodiments, a retroreflector occupies a large area, for example, an area of greater than 1 ft$^2$. Optionally, a retroreflector is formed using an embossing method. For example, U.S. Pat. No. 6,644,818 discloses an embossing roll and techniques for forming embossed retroreflective structures.

Useful blazed diffraction gratings include dynamically controllable diffraction gratings, electrically controllable diffraction gratings, fixed diffraction gratings, physical diffraction gratings, phase diffraction gratings and permanent diffraction gratings. In embodiments, a blazed diffraction grating occupies a large area, for example, an area greater than 1 ft$^2$. In an embodiment, a large-area blazed diffraction grating is formed from using a lithographic patterning technique. In embodiments, a large-area blazed diffraction grating is formed from an array of smaller blazed diffraction gratings. For example, multiple blazed diffraction gratings made using a ruling engine or a lithographic patterning technique can be placed adjacent to one another to form a large-area blazed diffraction grating. Optionally, a large-area blazed diffraction grating is formed using an embossing method. In one embodiment, a patterned cylindrical embossing roll is used for embossing a blazed diffraction grating. Useful embossing rolls include those patterned by a ruling engine or a lithographic patterning technique. Useful embossing rolls include those molded from a patterned master, for example a master mold patterned by a ruling engine or a lithographic patterning technique.

In a specific embodiment, a smart window further comprises a first window pane. Optionally, the first blazed diffraction grating is incorporated into the first window pane. Optionally, the first blazed diffraction grating comprises a film on the first window pane. In embodiments, the second blazed diffraction grating is incorporated into the first window pane or comprises a film on the first window pane.

In a specific embodiment, a smart window further comprises a first window pane and a second window pane positioned in optical communication with the first window pane. Optionally, the second blazed diffraction grating is incorporated into the second window pane. Optionally, the second blazed diffraction grating comprises a film on the second window pane. In specific embodiments, a space is provided between a first window pane and a second window pane. Useful window pane spacings include those selected over the range of 0 to 5 cm.

In embodiments, a smart window further comprises one or more additional blazed diffraction gratings, for example a third blazed diffraction grating, a fourth blazed diffraction gratings, etc. In an embodiment, an additional blazed diffraction grating is useful for diffracting near-infrared electromagnetic radiation or visible electromagnetic radiation. In general, each additional blazed diffraction grating has its own blaze direction, its own grating pitch and its own blaze angle, and is positioned in optical communication with one or more other blazed diffraction gratings in a smart window, for example for receiving at least partially diffracted electromagnetic radiation from another blazed diffraction grating and/or for providing at least partially diffracted electromagnetic radiation to another blazed diffraction grating. In a specific embodiment, a first blazed diffraction grating is optimized for diffraction of visible electromagnetic radiation and a second blazed diffraction grating and a third blazed diffraction grating are optimized for diffraction of different spectral regions of near-infrared electromagnetic radiation.

Optionally, the grating pitches of each blazed diffraction grating in a smart window are independent. In a specific embodiment, the grating pitches of the different blazed diffraction gratings are different. Optionally the blaze angles of the different blazed diffraction gratings in a smart window are independent. In a specific embodiment, the blaze angles of the different blazed diffraction gratings are different.

Optionally, the blaze directions of the different blazed diffraction gratings in a smart window are independent. In a specific embodiment, however, the blaze direction for each visible blazed diffraction grating is oriented opposite to the blaze direction of each near-infrared blazed diffraction grating. For example, in an embodiment, the blaze directions for all visible blazed diffraction gratings in a smart window are the same and the blaze directions for all near-infrared blazed diffraction gratings in a smart window are the same but oriented opposite to the blaze directions for the visible blazed diffraction gratings.

In a specific embodiment, two or more blazed diffraction gratings in a smart window are parallel. In certain embodiments, two or more blazed diffraction gratings in a smart window are not exactly parallel. In specific embodiments, two or more blazed diffraction gratings in a smart window are substantially parallel, for example, where the gratings in any pair of blazed diffraction gratings are relatively oriented within 5 degrees from being exactly parallel to each other.

In embodiments, the blaze directions of two or more blazed diffraction gratings in a smart window are opposite. In embodiments, the blaze directions of two or more blazed diffraction gratings in a smart window are the same. For certain embodiments, the blaze directions of two or more blazed gratings are oriented substantially opposite, for example where the blaze directions of the gratings in any pair of blazed diffraction gratings are relatively oriented within 5 degrees from exactly opposite. For certain embodiments, the blaze directions of two or more blazed gratings are oriented to be substantially the same, for example, where the blaze directions of the gratings in any pair of blazed diffraction gratings are relatively oriented within 5 degrees from being exactly the same.

Useful grating pitches for a blazed diffraction grating include those selected over the range of 1.0 µm to 6.0 µm. In a specific embodiment, the grating pitch is selected over the range of 1 µm to 3 µm. In a specific embodiment, the grating pitch is selected over the range of 2 µm to 6 µm. Optionally, the grating pitch is smaller than 2.5 µm. Optionally, the grating pitch is larger than 2.5 µm.

Useful blaze angles for a blazed diffraction grating include those selected over the range of 10 to 50 degrees. In specific embodiments, the blaze angle is selected over the range of 20 to 35 degrees. In specific embodiments, the blaze angle is selected over the range of 25 to 40 degrees. Optionally, the blaze angle is smaller than 30 degrees. Optionally, the blaze angle is larger than 30 degrees.

In specific embodiments, a smart window comprises a first blazed diffraction grating for diffracting visible electromagnetic radiation, the first blazed diffraction grating having a first blaze direction, a first grating pitch and a first blaze angle and positioned for receiving electromagnetic radiation; a second blazed diffraction grating for diffracting near-infrared electromagnetic radiation of a certain spectral region, the second blazed diffraction grating having a second blaze direction, a second grating pitch and a second blaze angle and positioned in optical communication with the first blazed diffraction grating for receiving electromagnetic radiation at least partially diffracted by the first blazed diffraction grating; and a third blazed diffraction grating for diffracting near-infrared electromagnetic radiation of a different spectral region than that in the case of the second blazed diffraction grating, the third blazed diffraction grating having a third blaze direction, a third grating pitch and a third blaze angle and positioned in optical communication with the second blazed diffraction grating for receiving electromagnetic radiation at least partially diffracted by said second blazed diffraction grating.

In an embodiment, the first grating pitch and the second grating pitch are different. In an embodiment, the first blaze angle and the second blaze angle are different. In an embodiment the first blaze direction is oriented opposite to the second blaze direction. In an embodiment, the first grating pitch and the third grating pitch are different. In an embodiment, the first blaze angle and the third blaze angle are different. In an embodiment, the first blaze direction is oriented opposite to the third blaze direction.

A specific embodiment further comprises a fourth blazed diffraction grating for diffracting near-infrared electromagnetic radiation of a spectral region different from those in the cases of the second and third blazed diffraction gratings, the fourth blazed diffraction grating having a fourth blaze direction, a fourth grating pitch and a fourth blaze angle, and positioned in optical communication with the third blazed diffraction grating for receiving at least partially diffracted electromagnetic radiation. In an embodiment, the first grating pitch and the fourth grating pitch are different. In an embodiment, the first blaze angle and the fourth blaze angle are different. In an embodiment, the first blaze direction is oriented opposite to the fourth blaze direction.

In an specific embodiment, a smart window comprises a first blazed diffraction grating for diffracting visible electromagnetic radiation, the first blazed diffraction grating having a first blaze direction, a first grating pitch and a first blaze angle; and a second blazed diffraction grating for diffracting near-infrared electromagnetic radiation, the second blazed diffraction grating having a second blaze direction, a second grating pitch and a second blaze angle and positioned in optical communication with the first blazed diffraction grating for receiving electromagnetic radiation at least partially diffracted by the first blazed diffraction grating, wherein the first blaze direction is oriented opposite to said second blaze direction; and wherein the first grating pitch is selected over the range of 1 µm to 3 µm and the first blaze angle is selected over the range of 20 to 35 degrees, thereby providing for diffraction of visible electromagnetic radiation by the first diffraction grating; and wherein the second grating pitch is selected over the range of 2 µm to 6 µm and the second blaze direction is selected over the range of 25 to 40 degrees, thereby providing for diffraction of near-infrared electromagnetic radiation by the second diffraction grating.

In a specific smart window embodiment, a blazed grating is positioned for receiving incident solar electromagnetic radiation. In an embodiment, the smart window is an external window on a building, such that an external surface of the smart window is exposed to incident solar radiation and the opposite external surface of the smart window faces the interior of the building. In an embodiment, the smart window is a window on a commercial building. In an embodiment, the smart window is a window on a residential building. In an exemplary embodiment, the smart window is a south facing window.

Optionally, smart window embodiments further comprise a UV blocking layer, for example positioned in optical communication with a window pane and/or a diffraction grating. In an embodiment, a UV blocking layer comprises a UV absorbing film, for example applied or deposited on a surface of a window pane. In certain embodiments, a window pane comprises a UV blocking layer, for example a window pane comprising a UV absorbing polymer or a window pane comprising UV absorbing particles. In certain embodiments, a UV blocking layer comprises a reflective dielectric multilayer, for example a reflective dielectric multilayer applied or deposited on a surface of a window pane.

In another aspect, provided are methods for spatially separating visible and near infrared electromagnetic radiation. One method of this aspect comprises the steps of providing a smart window as described herein and passing solar electromagnetic radiation through the smart window, thereby spatially separating solar visible and solar near infrared electromagnetic radiation. A specific method of this aspect comprises the steps of providing a first blazed diffraction grating, the first blazed diffraction grating having a first blaze direction, a first grating pitch and a first blaze angle; providing a second blazed diffraction grating positioned in optical communication with the first blazed diffraction grating, the second blazed diffraction grating having a second blaze direction, a second grating pitch and a second blaze angle, and wherein the first grating pitch and the second grating pitch are different, wherein the first blaze angle and the second blaze angle are different and wherein the second blaze direction is oriented opposite to said first blaze direction; passing visible electromagnetic radiation and near-infrared electromagnetic radiation through the first blazed diffraction grating, wherein at least a portion of the visible electromagnetic radiation is diffracted by the first blazed diffraction grating in a first diffraction direction and a majority of said near-infrared electromagnetic radiation is not diffracted by said first blazed diffraction grating, thereby generating diffracted visible electromagnetic radiation and non-diffracted near-infrared electromagnetic radiation; passing the diffracted visible electromagnetic radiation and the non-diffracted near-infrared electromagnetic radiation through the second blazed diffraction grating, wherein at least a portion of the non-diffracted near-infrared electromagnetic radiation is diffracted by the second blazed diffraction grating in a second diffraction direction, thereby generating diffracted near-infrared electromagnetic radiation; wherein the first diffraction direction is different from the second diffraction direction, thereby spatially separating said visible electromagnetic radiation and said near-infrared electromagnetic radiation. In a specific embodiment, the first grating pitch is smaller than the second grating pitch. In a specific embodiment, the first blaze angle is smaller than the second blaze angle.

Another method of this aspect comprises the steps of providing a first blazed diffraction grating, the first blazed diffraction grating having a first blaze direction, a first grating pitch and a first blaze angle; providing a second blazed diffraction grating positioned in optical communication with the first blazed diffraction grating, the second blazed diffraction grating having a second blaze direction, a second grating pitch and a second blaze angle, wherein the first grating pitch and the second grating pitch are different, wherein the first blaze angle and the second blaze angle are different and wherein the second blaze direction is oriented opposite to the first blaze direction; providing a third blazed diffraction grating positioned in optical communication with the second blazed diffraction grating, the third blazed diffraction grating having a third blaze direction, a third grating pitch and a third blaze angle, wherein the first grating pitch and the third grating pitch are different, wherein the first blaze angle and the third blaze angle are different and wherein the third blaze direction is oriented opposite to the first blaze direction; passing visible electromagnetic radiation and near-infrared electromagnetic radiation through the first blazed diffraction grating, wherein at least a portion of the visible electromagnetic radiation is diffracted by the first blazed diffraction grating in a first diffraction direction and a majority of the near-infrared electromagnetic radiation is not diffracted by the first blazed diffraction grating, thereby generating diffracted visible electromagnetic radiation and non-diffracted near-infrared electromagnetic radiation of a first wavelength or wavelength region; passing the diffracted visible electromagnetic radiation and the non-diffracted near-infrared electromagnetic radiation of the first wavelength or wavelength region through the second blazed diffraction grating, wherein at least a portion of the non-diffracted near-infrared electromagnetic radiation of the first wavelength or wavelength region is diffracted by the second blazed diffraction grating in a second diffraction direction, thereby generating diffracted near-infrared electromagnetic radiation of a second wavelength or wavelength region and non-diffracted near-infrared electromagnetic radiation of a third wavelength or wavelength region; and passing the diffracted visible electromagnetic radiation, the diffracted near-infrared electromagnetic radiation of the second wavelength or wavelength region and the non-diffracted near-infrared electromagnetic radiation of the third wavelength or wavelength region through the third blazed diffraction grating, wherein at least a portion of the non-diffracted near-infrared electromagnetic radiation of the third wavelength or wavelength region is diffracted by the third blazed diffraction grating in a third diffraction direction, thereby generating diffracted near-infrared electromagnetic radiation of a fourth wavelength or wavelength region; wherein the first diffraction direction is different from the second diffraction direction, the third diffraction direction or both the second diffraction direction and the third diffraction direction, thereby spatially separating the visible electromagnetic radiation and the near-infrared electromagnetic radiation.

In one embodiment, the first, second and third diffraction directions are different. In another embodiment the second diffraction direction is the same as the third diffraction direction. In an embodiment, the first grating pitch is smaller than the second grating pitch and the third grating pitch. In an embodiment, the first blaze angle is smaller than the second blaze angle and the third blaze angle. In an embodiment, the first wavelength or wavelength region is different from the fourth wavelength or wavelength region.

In embodiments, methods of this aspect further comprise the steps of providing a retroreflector in optical communication with the second blazed diffraction grating; and reflecting at least a portion of the diffracted near-infrared electromagnetic radiation with the retroreflector.

In another aspect, provided are methods of dynamically controlling the transmission and/or rejection of solar near-infrared electromagnetic radiation. A method of this aspect comprises the steps of providing a smart window as described herein, passing solar electromagnetic radiation through the smart window, thereby generating diffracted near-infrared electromagnetic radiation, and dynamically controlling the presence or absence of a retroreflector positioned to retroreflect the diffracted near-infrared electromagnetic radiation.

Another method of this aspect comprises the steps of providing a smart window as described herein, passing solar electromagnetic radiation through the smart window, thereby generating diffracted near-infrared electromagnetic radiation, and dynamically controlling the orientation of a retroreflector positioned to selectively retroreflect the diffracted near-infrared electromagnetic radiation.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful. It will be evident to one having skill in the art that the accompanying drawings may not be to scale to better illustrate certain aspects of the invention.

DETAILED DESCRIPTION

In general the terms and phrases used herein have their art-recognized meanings, which can be found by reference to standard texts, journal references and contexts known to those skilled in the art. The following definitions are provided to clarify their specific use in the context of the invention.

"Diffraction" refers to the optical interference phenomenon arising from the interaction between electromagnetic radiation and a physical object. As used herein, use of the term diffraction is intended to be consistent with use in the field of optics.

"Diffraction grating" refers to a repetitive array of diffracting elements having the effect of producing periodic alterations in the phase, amplitude or both of incident electromagnetic radiation. In embodiments, a diffraction grating comprises an array of linear grooves. In embodiments, a diffraction grating comprises an array of linear slits. In embodiments, a diffraction grating comprises a repetitive array of different indices of refraction. In embodiments, a diffraction grating is planar or substantially planar. In embodiments, a diffraction grating is non-planar.

A "controllable diffraction grating" refers to a diffraction grating having a diffractive structure which is dynamically controllable, for example by application of an electric voltage and/or current. In contrast, a "fixed diffraction grating" or a "permanent diffraction grating" refers to a diffraction grating having a non-dynamic diffractive structure. In an embodiment, a fixed diffraction grating comprises a repetitive array of physical diffractive structures. In an embodiment a controllable diffraction grating comprises a material with controllable optical properties, such as index of refraction. Controllable diffraction gratings are described in U.S. Pat. No. 7,940,457 which is hereby incorporated by reference.

Figure 1A:
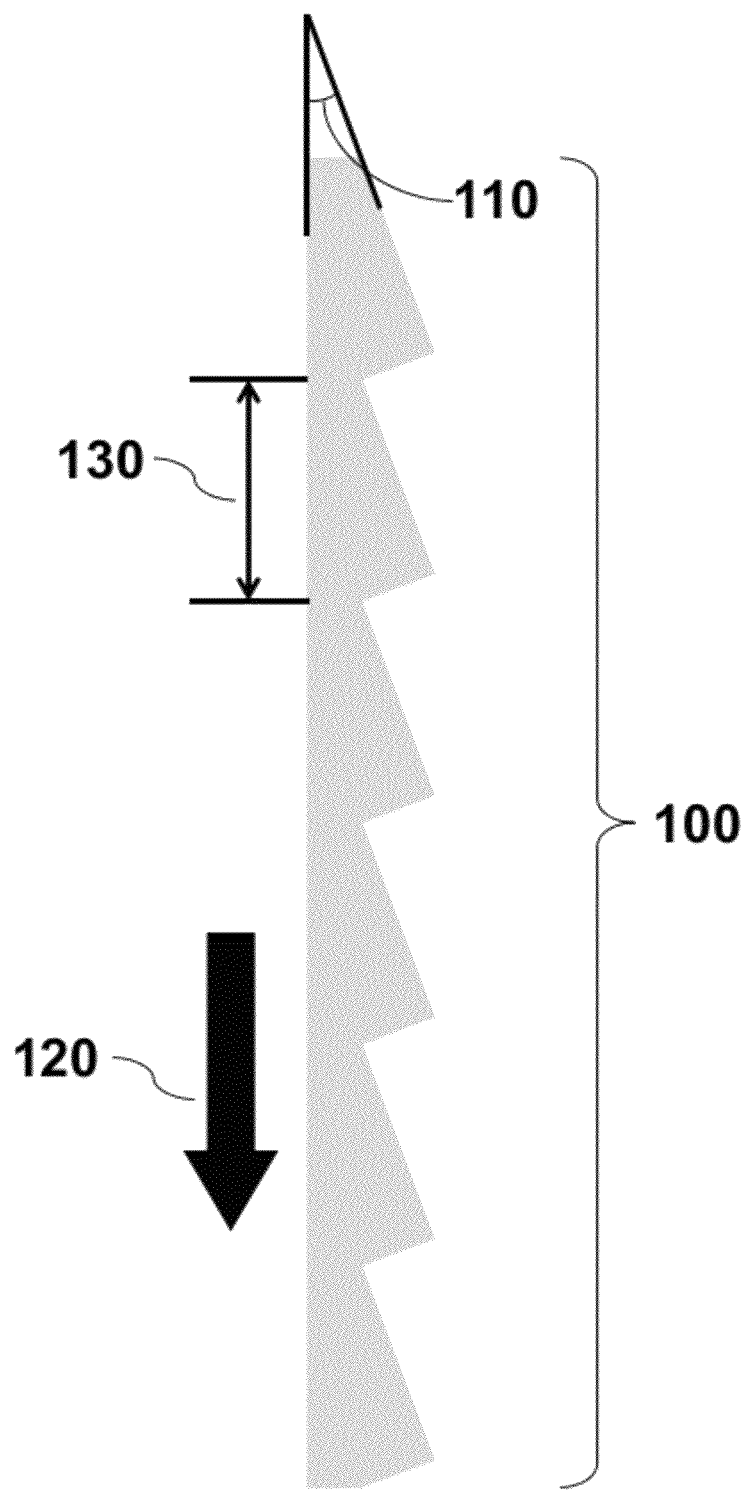
FIG. 1A provides a schematic diagram of a blazed diffraction grating.

"Grating pitch" refers to the spatial separation between repetitive elements in a diffraction grating. FIG. 1A illustrates an embodiment of a diffraction grating 100 with grating pitch 130.

A "blazed grating" or "blazed diffraction grating" is a special type of diffraction grating that allows the diffracted radiation in a given spectral region to be highly concentrated into a desired, specific, non-zero diffraction order (generally +1 or −1). In embodiments, this is accomplished by forming grooves of a properly designed saw-tooth profile, as illustrated in FIG. 1A. Such grooves, for example, can comprise physical material and/or a spatial arrangement of indices of refraction. In embodiments, the specific inclination of the groove face provides a constructive phase relationship between electromagnetic radiation exiting from different grooves, thus enabling the diffracted light of the given spectral band to be concentrated into a desired single diffraction order. In embodiments, this configuration allows a blazed grating to separate different wavelengths of electromagnetic radiation extremely efficiently.

"Blaze angle" refers to the specific inclination of the groove face of a blazed grating. FIG. 1A illustrates an embodiment of a blazed diffraction grating 100 having blaze angle 110.

In an embodiment, a blazed grating which "provides for diffraction" or is "optimized for diffraction" or is "for diffraction" or is "blazed for diffraction" of a specific wavelength or wavelength region of electromagnetic radiation has a grating pitch and blaze angle selected such that the blazed grating concentrates diffracted electromagnetic radiation of the specific wavelength or wavelength region into a desired non-zero diffraction order (e.g., +1 or −1). In embodiments, wavelengths or wavelength regions falling outside of the specific wavelength region that the blazed grating is optimized for remain undiffracted or may be at least partly diffracted into a non-desired diffraction order.

"Diffraction direction" refers to a relative angular deviation between radiation incident on a diffraction grating or series of diffraction gratings and radiation diffracted by the diffraction grating or series of diffraction gratings.

Figure 1B:
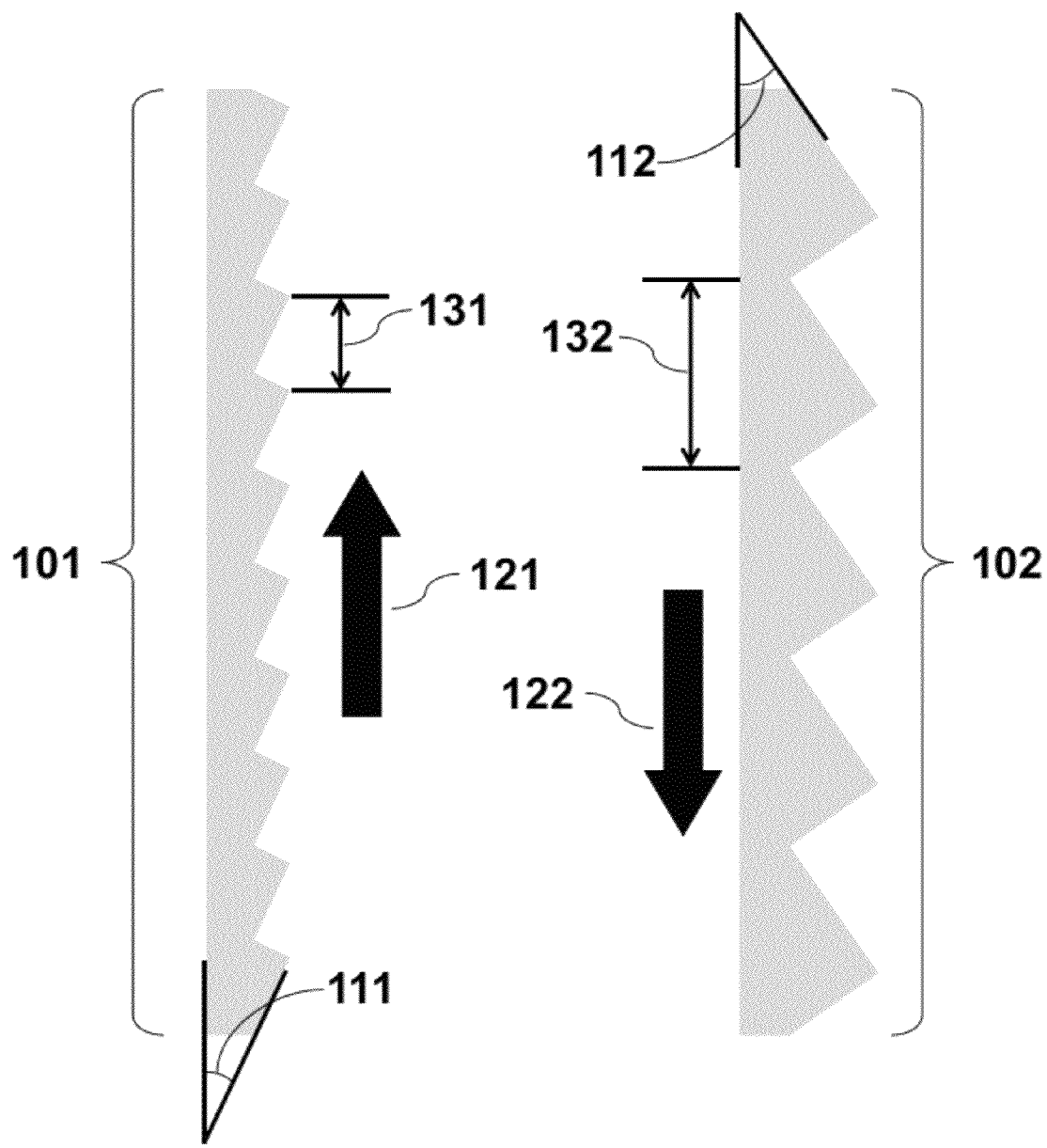
FIG. 1B provides a schematic diagram of two blazed diffraction gratings.

"Blaze direction" refers to a relative direction of a blazed diffraction grating indicating the direction, relative to the incident radiation, that the concentrated diffraction mode occurs. FIG. 1A illustrates an embodiment of a blazed diffraction grating 100 and indicates the blaze direction 120. In embodiments, blaze directions that are "oriented opposite" to one another refers to the relative orientation between two diffraction gratings such that their blaze directions are generally oriented 180° from one another. FIG. 1B illustrates two blazed diffraction grating embodiments 101 and 102 and indicates the blaze directions 121 and 122 are oriented opposite. In embodiments, blaze directions that are "substantially opposite" to one another refers to the relative orientation between two diffraction gratings such that their blaze directions are generally oriented at an angle of more than 170° from one another.

"Visible electromagnetic radiation" generally refers to electromagnetic radiation that can be detected by the human eye. In embodiments, visible electromagnetic radiation has a wavelength selected between about 400 nm and about 700 nm.

"Infrared electromagnetic radiation" generally refers to electromagnetic radiation having wavelengths longer than visible electromagnetic radiation, for example having a wavelength selected between about 700 nm and about 10000 nm. "Near-infrared electromagnetic radiation" refers to that portion of infrared electromagnetic radiation having wavelengths closest to visible electromagnetic radiation, for example between about 700 nm and about 3000 nm.

"Retroreflector" refers to a reflective element used for reflecting incident radiation back towards its source. In embodiments, a retroreflector comprises a mirrored surface. In embodiments, a retroreflector comprises a corner cube element. In embodiments, a retroreflector comprises an array of corner cube elements. In embodiments, a retroreflector comprises an array of cat's eye type elements.

A "pane" refers to a sheet of material used in a window, for example a sheet of material which is at least partially transparent to visible electromagnetic radiation. In an embodiment, a pane is a large-area sheet, for example having an area greater than 1 ft$^2$. In embodiments, a window pane comprises a glass. In embodiments, a window pane comprises a polymer, for example a plastic or a thermoplastic.

"Film" refers to a coating or layer of material positioned on a substrate such as a window pane. In an embodiment, a film includes a patterned structure, such as a diffraction grating or a retroreflector. In an embodiment, a film is deposited directly on a substrate. In an embodiment, a film is applied to a substrate, for example, as a continuous layer of material from a roll. In embodiments, films are patterned using a lithographic method. In embodiments, films are patterned using a stamping or molding process. In embodiments, films are patterned using an embossing roll.

"Optical communication" refers to a configuration of two or more elements wherein one or more beams or rays of electromagnetic radiation are capable of propagating from one element to the other element. Elements in optical communication may be in direct optical communication or indirect optical communication. "Direct optical communication" refers to a configuration of two or more elements wherein one or more beams or rays of electromagnetic radiation propagate directly from a first element to another without use of optical components for steering and/or combining the beams or rays. "Indirect optical communication" refers to a configuration of two or more elements wherein one or more beams or rays of electromagnetic radiation propagate between two elements via one or more device components including, but not limited to, waveguides, fiber optic elements, windows, reflectors, filters, prisms, lenses, gratings and any combination of these.

FIG. 1A illustrates a blazed diffraction grating embodiment. Grating 100 has a blaze angle 110 and grating pitch 130. In this embodiment, blaze angle 110 is approximately 21 degrees. FIG. 1A also indicates the blaze direction 120 of grating 100. FIG. 1B illustrates two blazed diffraction grating embodiments. Grating 101 has a blaze angle 111 and grating pitch 131. Grating 102 has a blaze angle 112 and grating pitch 132. In this embodiment, blaze angle 111 is approximately 25 degrees and blaze angle 112 is approximately 35 degrees. In this embodiment, grating pitch 131 is approximately one-half of grating pitch 132. Blaze directions 121 and 122 are indicated for grating 101 and 102, respectively, and are oriented opposite to one another.

Figure 2A:
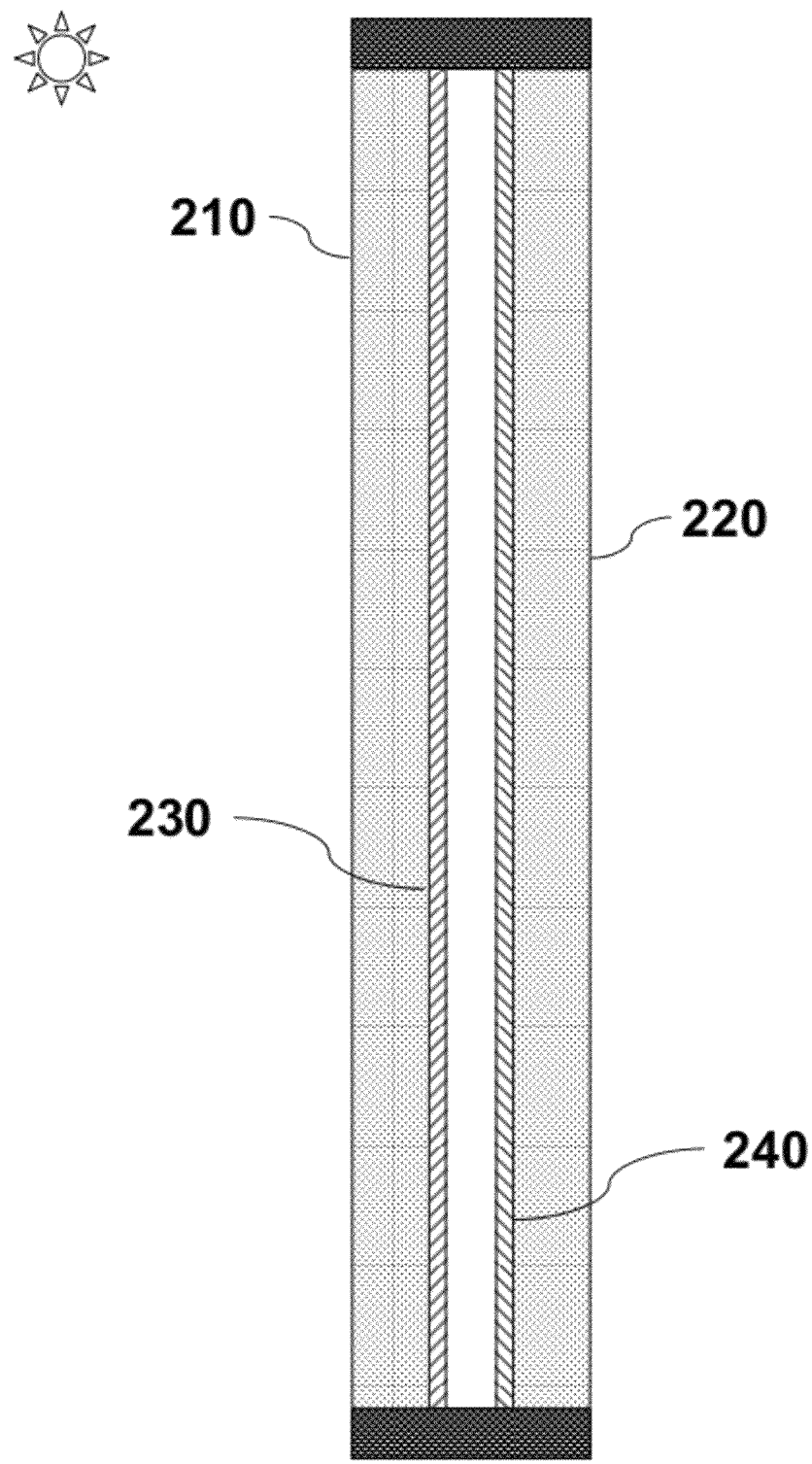
FIG. 2A provides a schematic diagram of a smart window embodiment.

FIG. 2A illustrates a smart window embodiment comprising first window pane 210, a first blazed grating 230, a second window pane 220 and a second blazed grating 240. First blazed grating 230 is shown as a film on first window pane 210 and second blazed grating 240 is shown as a film on second window pane 220. In this embodiment, blaze directions of first blazed grating 230 and second blazed grating 240 are opposite to one another. FIG. 2A shows an optional space between first blazed grating 230 and second blazed grating 240. Optionally, a smart window embodiment further includes a retroreflector (not shown in FIG. 2A), for example, for rejection of near-infrared electromagnetic radiation. Optionally, alternate configurations where first and second blazed gratings are films applied on a single window pane or where first and/or second blazed gratings are films applied on the exterior surface(s) of a double-pane window are contemplated. In an embodiment where solar radiation is first incident on first window pane 210, first blazed grating 230 comprises a blazed grating optimized for diffraction of visible electromagnetic radiation; in this embodiment, second blazed grating 240 comprises a blazed grating optimized for diffraction of near-infrared radiation.

Figure 2B:
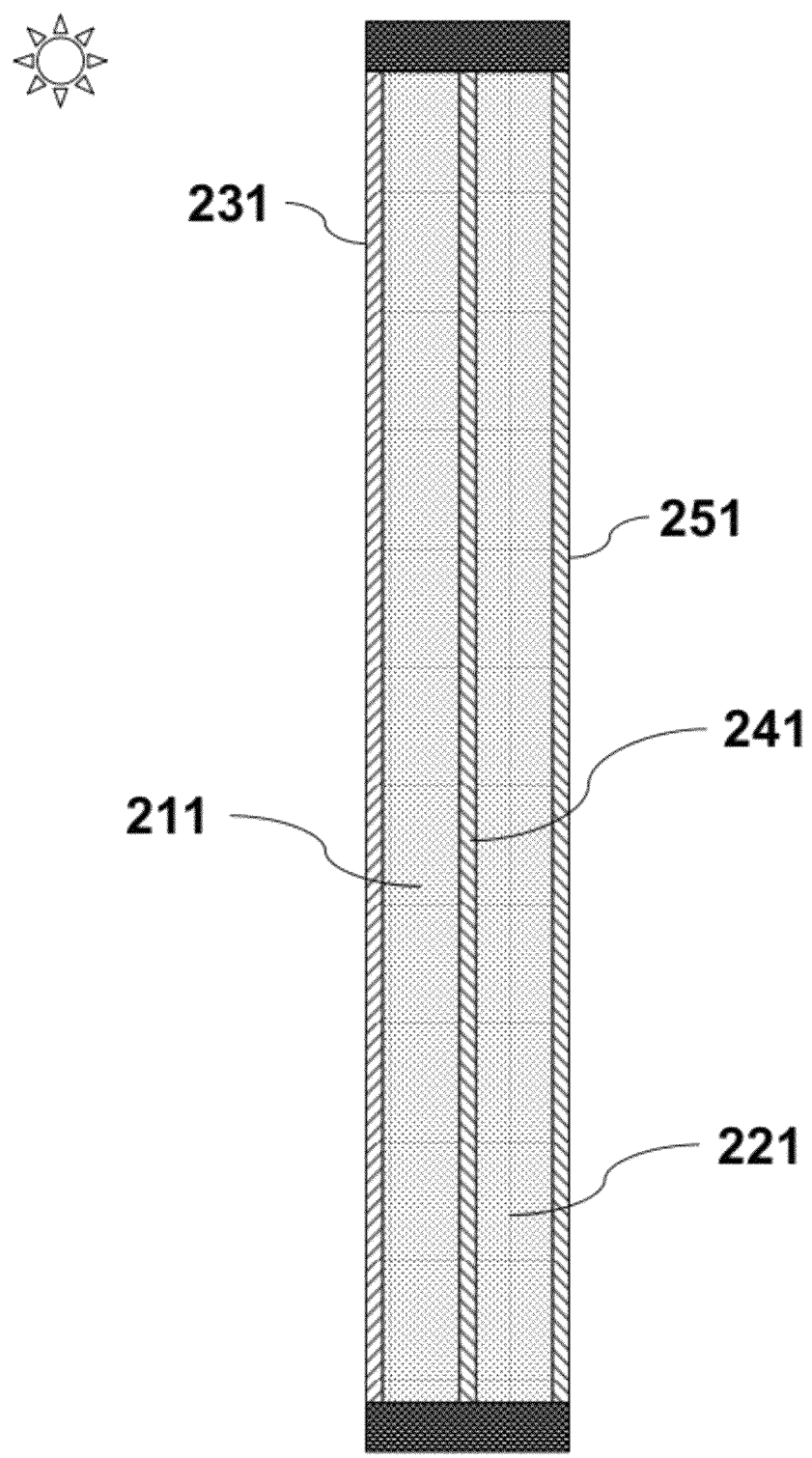
FIG. 2B provides a schematic diagram of a smart window embodiment.

FIG. 2B illustrates another smart window embodiment, comprising first window pane 211, first blazed grating 231, second blazed grating 241, second window pane 221 and third blazed grating 251. First blazed grating 231, second blazed grating 241 and third blazed grating 251 are shown as films. Optionally, a space is provided between first window pane 211 and second blazed grating 241 or between second blazed grating 241 and second window pane 221 (space not shown). In an embodiment, first blazed grating 231 is optimized for diffraction of visible electromagnetic radiation, second blazed grating 241 is optimized for diffraction of near-infrared electromagnetic radiation and third blazed grating 251 is optimized for diffraction of near-infrared electromagnetic radiation. In an embodiment, second blazed grating 241 is optimized for diffraction of near-infrared radiation of a different wavelength or wavelength region from that of third blazed grating 251. In an embodiment, first blazed grating 231 has a blaze direction that is opposite to the blaze directions of second blazed grating 241 and third blazed grating 251.

Figure 2C:
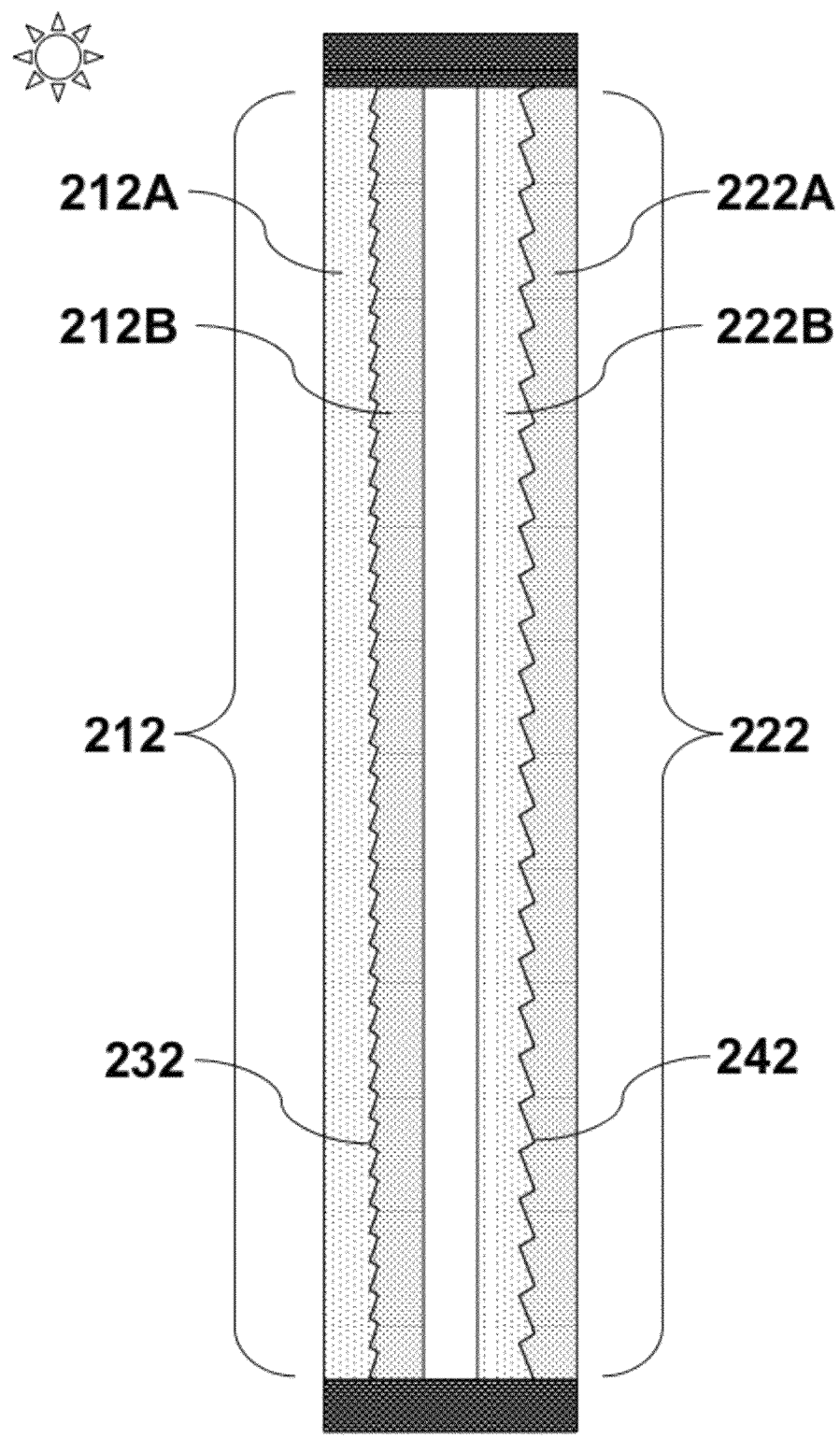
FIG. 2C provides a schematic diagram of a smart window embodiment.

FIG. 2C illustrates another smart window embodiment, comprising first window pane 212 and second window pane 222. In this embodiment, first blazed diffraction grating 232 is incorporated into first window pane 212. Here, first window pane 212 comprises two layers 212A and 212B which together form first blazed diffraction grating 232, for example optimized for diffraction of visible radiation. In this embodiment, second blazed diffraction grating 242 is incorporated into second window pane 222. Here, second window pane 222 comprises two layers 222A and 222B which together form second blazed diffraction grating 242, for example optimized for diffraction of near-infrared radiation. In this embodiment, the two layers 212A and 212B of first window pane 212 comprise different materials; similarly, the two layers 222A and 222B of second window pane 222 comprise different materials. Optionally, a UV blocking layer (not shown) is provided on the external side of first window pane 212. Optionally, additional blazed diffraction gratings (not shown) are included for further facilitating the separation of portions of the electromagnetic spectrum. For example, an additional blazed diffraction grating for diffraction of visible radiation can be incorporated into a smart window. Additionally, or alternatively, for example, an additional blazed diffraction grating for diffraction of near-infrared radiation can be incorporated into a smart window.

The invention may be further understood by the following non-limiting examples.

Example 1

Energy-Efficient Smart Window System

This example describes a smart window having the ability to angularly separate the visible (VIS) spectral region from the near-infrared (NIR) region of solar radiation using multiple physical diffractive structures, such as blazed diffraction gratings. For example, a blazed grating used in this example is designed for a specific wavelength region such that most of the diffracted radiation for that wavelength region is directed into the first order. Normally, employing such a blazed grating designed for the NIR region around 1 μm, the diffracted NIR radiation can be directed into the first order with high efficiency, whereas the first order diffraction efficiency of the VIS radiation will be very low. However, for effective angular separation of the VIS and NIR spectral components of the solar radiation by such a grating, a problem arises due to the second diffraction order because a blazed grating that is designed for 1 μm in the first order also acts a blazed grating in the second order for 0.5 μm, albeit with a lower efficiency. The smart window described in this example eliminates this problem by using two (or more) blazed gratings in series that are blazed for different wavelength regions, for example one for VIS region and the other blazed for NIR region, where their blaze directions are opposite to each other.

Figure 5A:
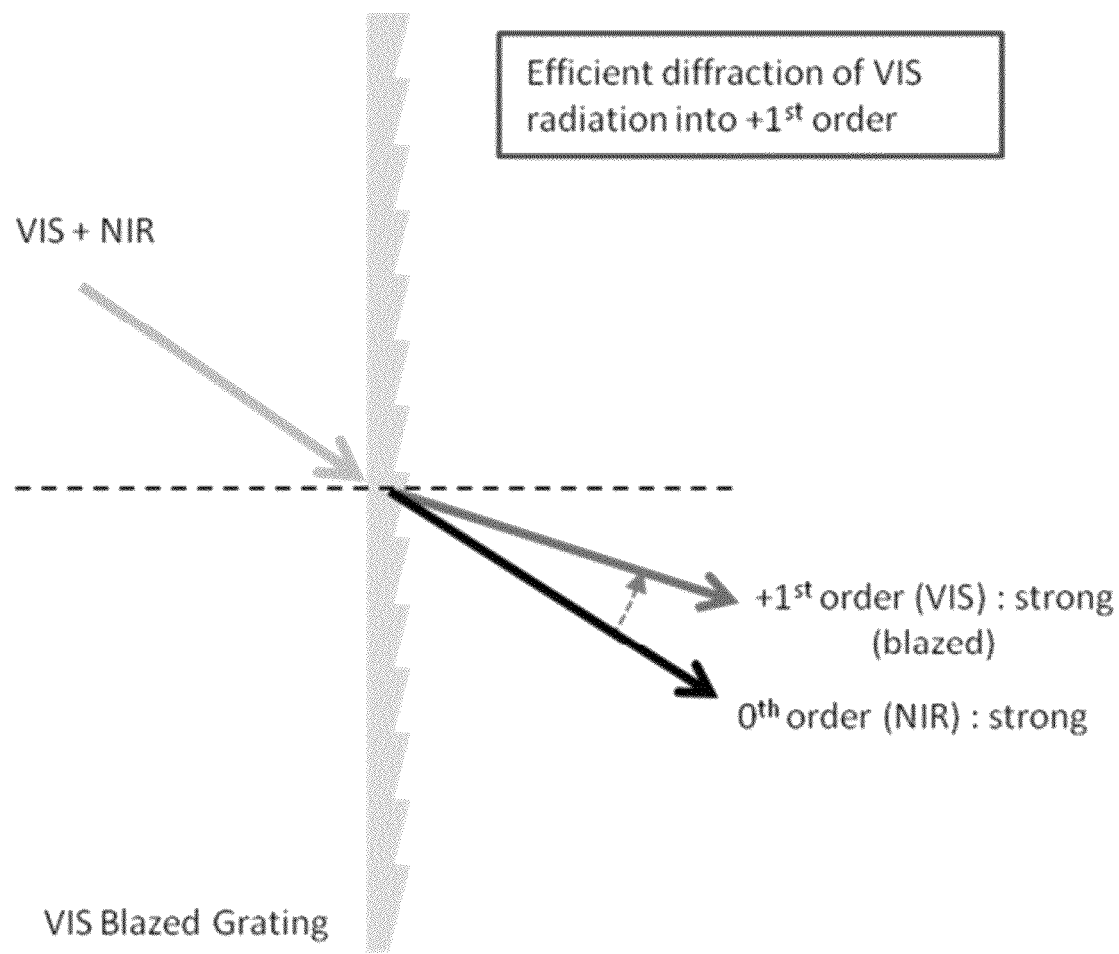
FIG. 5A provides a schematic diagram showing diffraction of visible radiation by a blazed diffraction grating optimized for diffraction of visible radiation.
Figure 5B:
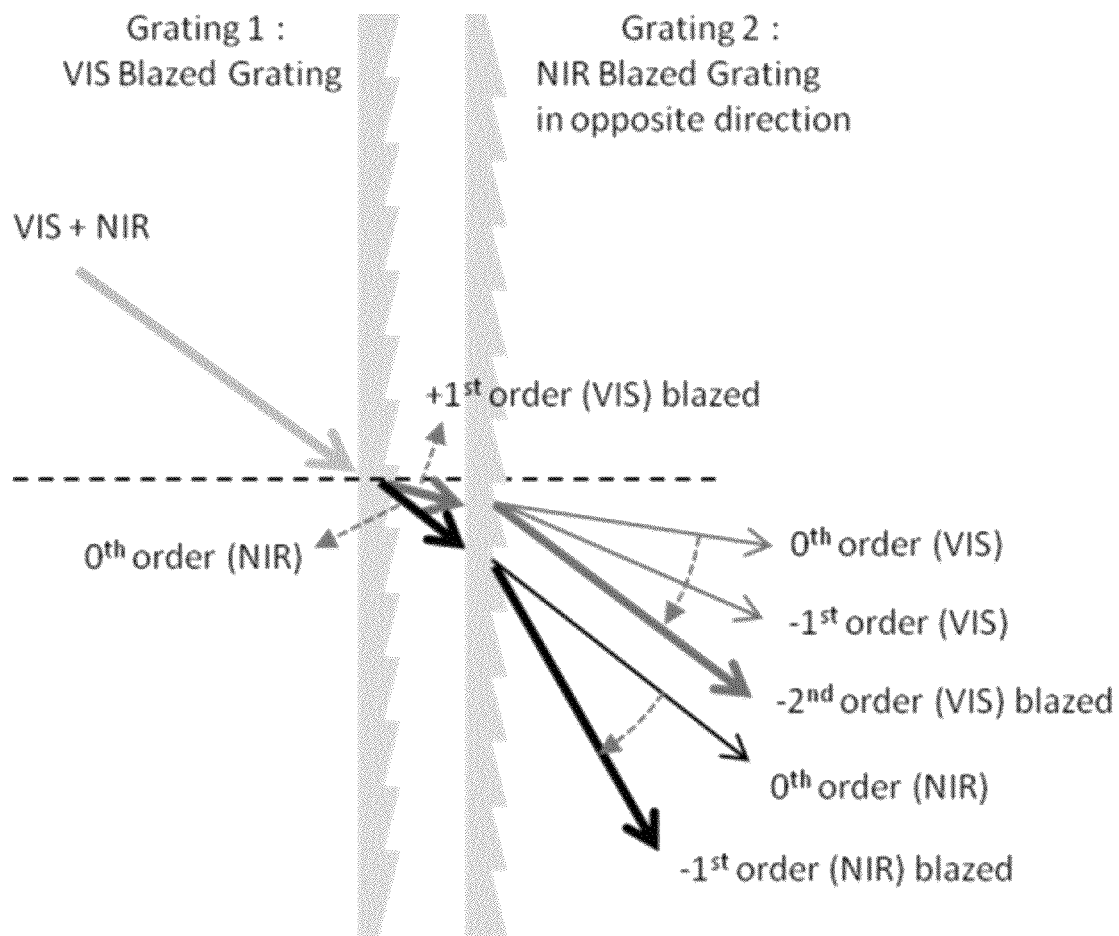
FIG. 5B provides a schematic diagram showing diffraction of visible and near-infrared radiation by a first blazed diffraction grating optimized for diffraction of visible radiation and a second blazed diffraction grating optimized for diffraction of near-infrared radiation.

In a representative configuration, the solar radiation first passes through a VIS diffraction grating that deviates the main diffracted rays counterclockwise from the incident direction, as shown in FIG. 5A. This VIS grating is very ineffective for incident NIR radiation; therefore, most of the transmitted NIR radiation is directed in the same direction as the incident rays. Next, the VIS and NIR emerging from the above grating are now incident on an NIR blazed grating whose groove direction is opposite to that for the first grating;

this causes the diffracted NIR rays to deviate clockwise from the incident direction, as shown in FIG. 5B.

For VIS rays, in addition to diffracting them into the lower orders, the second grating, acting as a blazed grating in the second order, deflects the second order diffracted VIS rays clockwise from the VIS rays incident on the second grating. However, due to their counterclockwise deviation caused by the first grating, the VIS rays transmitted from the second grating are angularly separated from the NIR rays emerging from the second grating. This angular separation between the NIR and the VIS rays allows for either accepting the NIR radiation by letting it enter the room (in winter months) or rejecting it (in summer months), for example, by reflecting it back through the diffraction gratings, enabling reduced heating or cooling costs, respectively, and simultaneously to accept the VIS radiation throughout the year, making it possible to also reduce interior lighting costs. The combination of these capabilities provides a truly versatile, highly energy-efficient window.

Smart window embodiments described in this example are useful for angularly separating the visible and near-infrared spectral components of the solar radiation transmitted by a window. The smart windows described in this example are useful for providing the ability to accept or reject the near-infrared spectral components of the solar radiation transmitted by a window while always accepting the visible component.

These smart window embodiments provide the advantage that the near-infrared component of the solar radiation is transmitted when desired or rejected when undesired, with high efficiency. These smart window embodiments provide the advantage that the visible component of the solar radiation is transmitted with high efficiency in conjunction with the transmission or rejection of the near-infrared component.

Smart window embodiments described in this example include multiple diffraction gratings in series fabricated for different blaze wavelengths and different diffraction directions. Smart window embodiments described in this example include a means to absorb or reflect the transmitted near-infrared radiation.

Figure 3:
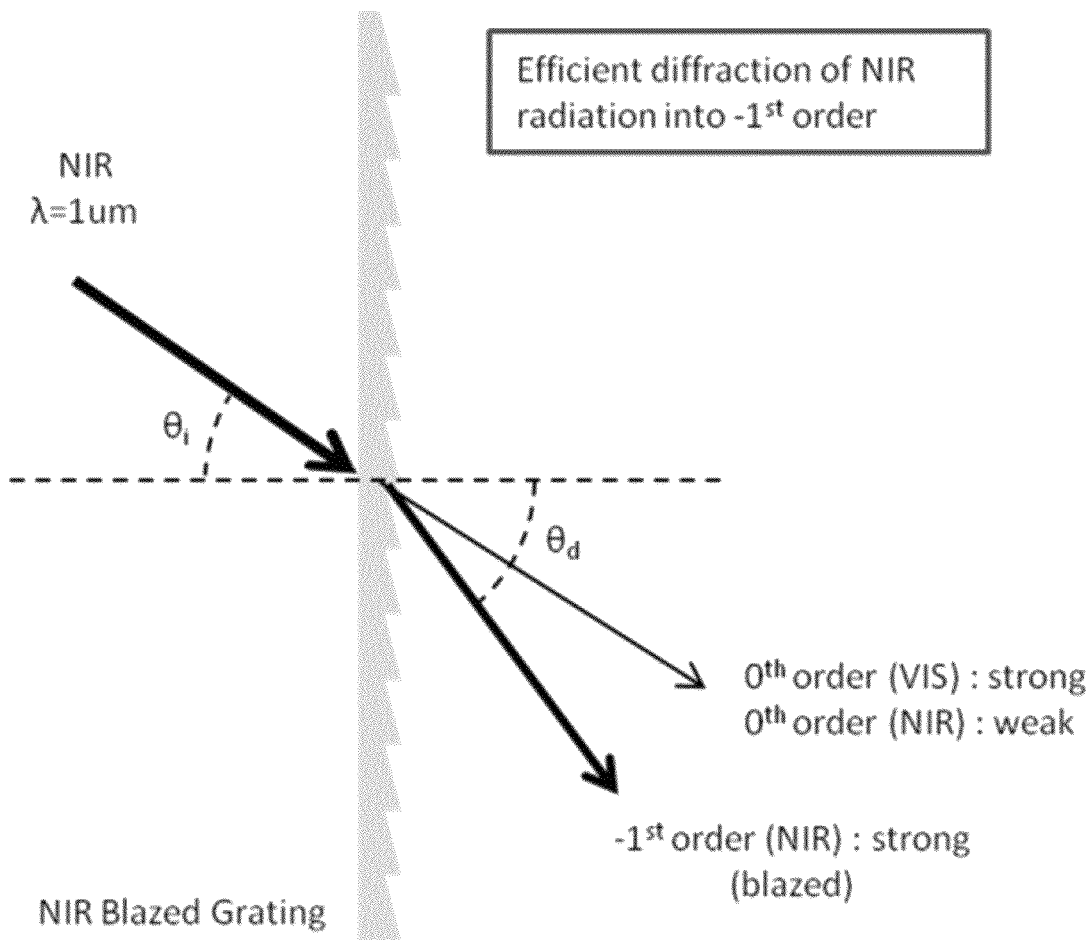
FIG. 3 provides a schematic diagram showing diffraction of near-infrared radiation by a blazed diffraction grating optimized for diffraction of near-infrared radiation.

The windows described in this example separate the visible (VIS) spectral region of the solar radiation from its near-infrared (NIR) region. The VIS and NIR regions can be separated angularly by a simple diffraction grating. The efficiency of a diffraction grating is maximized if it is fabricated as a 'blazed' grating. The blaze condition is met when the following relationship between the grating parameters, the wavelength, and the incident and transmitted optical rays is satisfied:

$$m\lambda = d(\sin\theta_i - \sin\theta_d) \quad [\text{Eq. 1}]$$

where m is the diffraction order (0, ±1, ±2, etc.), $\lambda$ the wavelength, d the groove pitch, $\theta_i$ the angle of incidence, and $\theta_d$ the angle of diffraction. A blazed grating is designed for a specific wavelength region such that most of the diffracted radiation for that wavelength region is directed into the first order, i.e., the diffraction efficiency is the highest for the first order and very low for the $0^{th}$, $2^{nd}$, and other orders, as illustrated in FIG. 3. If such a blazed grating is designed for the NIR region around 1 μm, the NIR radiation will be diffracted into the first order ($-1^{st}$ shown in FIG. 3) with high efficiency, whereas the first order diffraction of the VIS radiation will not meet the blaze condition and therefore its efficiency will be very low. Thus, in principle, such a grating should enable effective angular separation of the VIS and NIR spectral components of the solar radiation. However, such is not the case because a problem arises due to the $2^{nd}$ diffraction orders, as follows.

Figure 4:
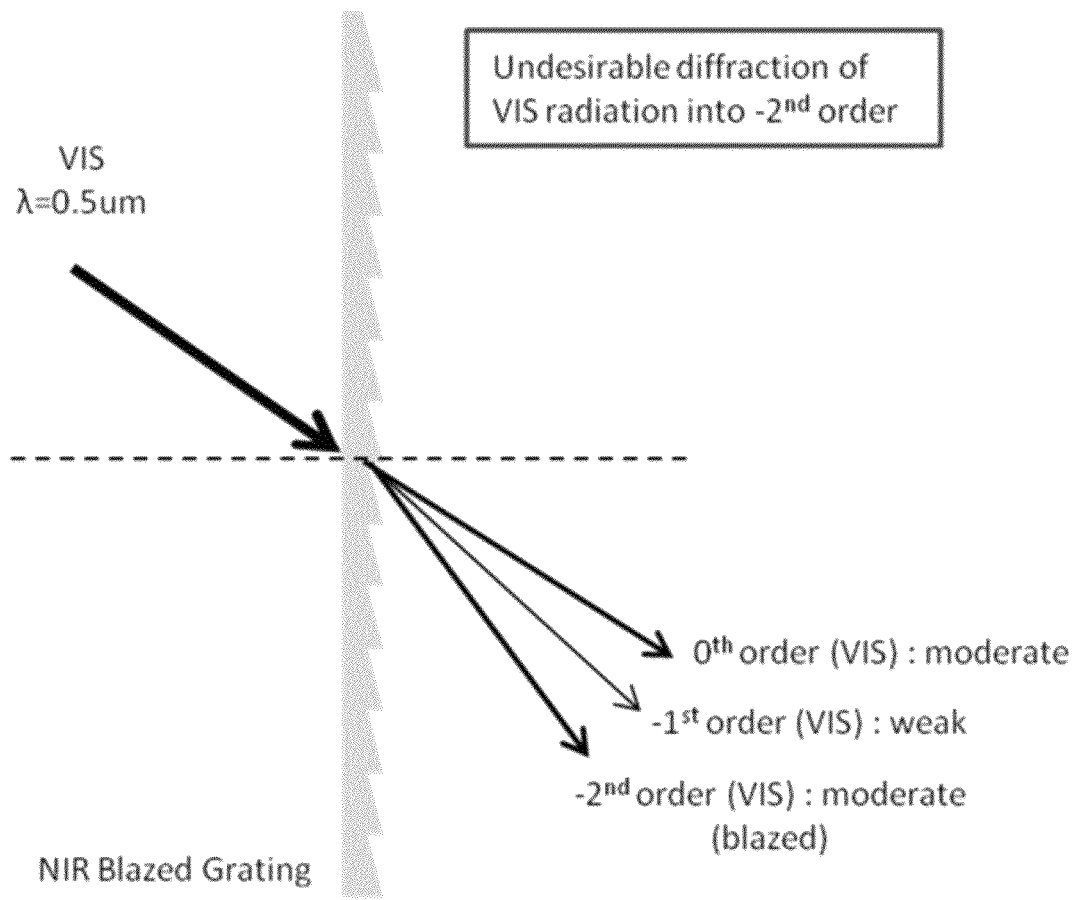
FIG. 4 provides a schematic diagram showing diffraction of visible radiation by a blazed diffraction grating optimized for diffraction of near-infrared radiation.

A blazed grating that is designed for 1 μm in the $1^{st}$ order ($\lambda$=1 μm and m=1 in Eq. 1) also acts a blazed grating in the $2^{nd}$ order for 0.5 μm ($\lambda$=0.5 μm and m=2 in Eq. 1), albeit with a lower efficiency. Thus, as shown in FIG. 4, the grating will diffract 0.5 μm radiation in $2^{nd}$ order at the same angle as it diffracts 1 μm radiation in $1^{st}$ order, thereby making their angular separation difficult. The same situation will be obtained for other wavelengths pairs that are apart by a factor of 2, e.g., 1.1 μm and 0.55 μm, 0.9 μm and 0.45 μm, etc. Thus, generally, the $1^{st}$ order diffracted NIR radiation will be mixed with $2^{nd}$ order diffracted VIS radiation. The windows described in this example eliminate this problem.

A feature employed in the windows of this example is the use of two blazed diffraction gratings in series that are blazed for different wavelength regions, for example one blazed for VIS region and the other blazed for NIR region, and their blaze directions are opposite to each other. FIGS. 5A and 5B illustrate the technique. The solar radiation first passes through a diffraction grating that is blazed for, say, 0.5 μm, and its grooves are so oriented that the blaze occurs for the $+1^{st}$ order that deviates the diffracted rays counterclockwise from the incident direction, as shown in FIG. 5A. As an example, such a grating can be fabricated with 600 grooves per millimeter (i.e., a grating pitch of 1.67 μm) and a blaze angle of 28.7 degrees, which will provide a deviation of +17.46 degrees for the 1st blaze order for the VIS blaze wavelength of 0.5 μm. It is emphasized that for NIR incident radiation of 1 μm wavelength, this VIS blazed grating is very ineffective as a grating; therefore, most of the transmitted NIR radiation is directed into the $0^{th}$ order, i.e., in the same direction as the incident rays.

The VIS and NIR emerging from the above grating are now made to be incident on a second grating. This second grating is blazed for a wavelength of 1 μm and its grooves are oriented in a direction opposite to that of the grooves of the first grating; this causes the blaze for 1 μm wavelength to occur for the $-1^{st}$ order that deviates the diffracted rays clockwise by 17.46 degrees from the incident direction, as shown in FIG. 5B. As an example, such a grating can be fabricated with 300 grooves per millimeter (i.e., a grating pitch of 3.33 μm) and a blaze angle of 31.7 degrees, which will provide a deviation of +17.46 degrees for the $1^{st}$ blaze order for the NIR blaze wavelength of 1 μm.

The VIS radiation passes through the second grating as follows. In addition to diffracting the VIS rays into the $0^{th}$ and $\pm 1^{st}$ orders, the second grating will act also as a blazed grating in the $-2^{nd}$ order for the VIS radiation, directing the $-2^{nd}$ order diffracted VIS rays at an angle 17.46 clockwise from the VIS rays incident on the second grating. However, since the first grating had already caused deviation of the VIS rays counterclockwise by 17.46 degrees (for the $+1^{st}$ order), the VIS rays emerging from the second grating in the $-2^{nd}$ blazed order are angularly separated by 17.46 degrees from the NIR rays emerging from the second grating in the $-1^{st}$ blazed order, as shown in FIG. 5B. It is this angular separation between the NIR and the VIS rays that is the key to making the window energy-efficient: it allows either acceptance or rejection of the NIR radiation (thereby reducing heating or cooling costs), while always accepting the VIS radiation (thereby reducing interior lighting costs). More details of how to exploit the angular separation between the NIR and the VIS rays are described below.

Figure 6:
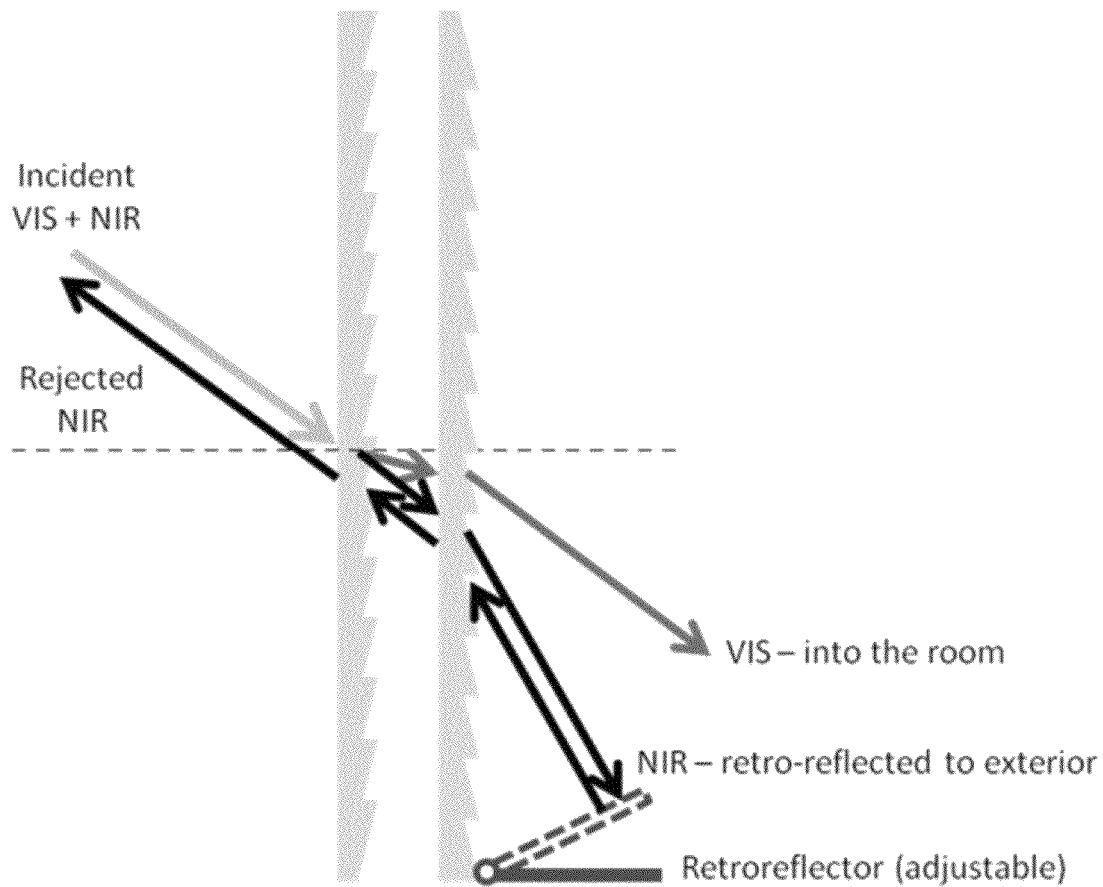
FIG. 6 provides a schematic diagram showing diffraction of visible and near infrared radiation by two blazed diffraction gratings and retroreflection of near-infrared radiation by a retroreflector.

Once the NIR diffracted radiation is angularly separated sufficiently from the VIS radiation, a variety of techniques can be employed to either reject or accept the NIR. One example for rejecting the NIR includes retroreflecting it and transmitting it back to outside the window; this is illustrated in FIG. 6. A technique to accept the NIR is to absorb the radiation as heat and then utilize the heat as an energy source for other beneficial purposes, such as heating water or air. Many other techniques can be considered for utilizing the NIR radiation. In all cases, the key step for energy efficiency is to angularly separate the NIR from the VIS radiation.

It is also possible and within the scope of this example to use more than two blazed gratings in series to further enhance the overall energy efficiency of the window system. For the VIS band, one blazed grating will be normally sufficient to enable acceptance of most of the VIS spectral component of the sun. However, since the NIR component extends in wavelength from about 700 nm to several μm, two or more NIR blazed gratings are useful for controlling acceptance or rejection of different segments of the NIR radiation. For example, one blazed NIR grating may be designed for the wavelength band 700-1000 nm, a second blazed NIR grating may be designed for the wavelength band 1000-1300 nm, and a third for 1300-1600 nm. Each of these NIR blazed gratings works in conjunction with the VIS grating as described above and together they enhance the overall energy efficiency of the window systems.

Dependence on Angle of Incidence.

The performance of the energy-efficient grating system has been comprehensively analyzed for dependence on the angle of incidence of the sun's rays on the window. Below are described how, due to the earth's rotation, the solar angle of incidence on a window surface at a given geographic location changes during the day as well as how the disclosed windows perform for different angles of incidence.

Variation of Solar Angle of Incidence.

Figure 7:
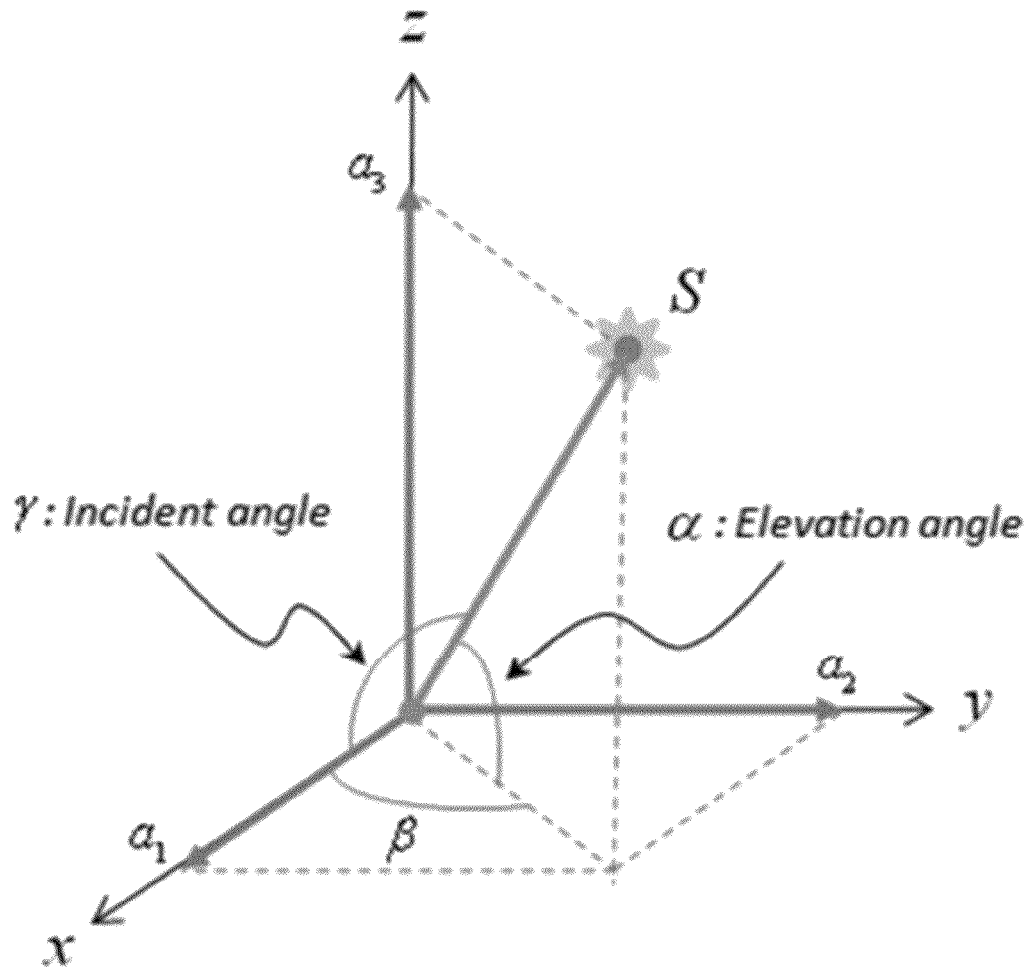
FIG. 7 provides a schematic diagram showing the relationship between the angle of incidence, azimuth and elevation angles of solar radiation.

The angle of incidence of the solar irradiance on a window can be obtained by first retrieving the azimuth angle and elevation angle for a specific time and location where the window in interest is placed and then calculating the angle of incidence from the geometrical relation with the azimuth and elevation angles, as depicted in FIG. 7.

The National Oceanic and Atmospheric Administration (NOAA) provides a solar position calculator which determines the solar azimuth angle and solar elevation angle for a specified date and time, given the geographic location (latitude and longitude) and time zone. Using this information, data sets can be generated for plotting the solar trajectory graphically at any given time, date, and location.

Figure 8A:
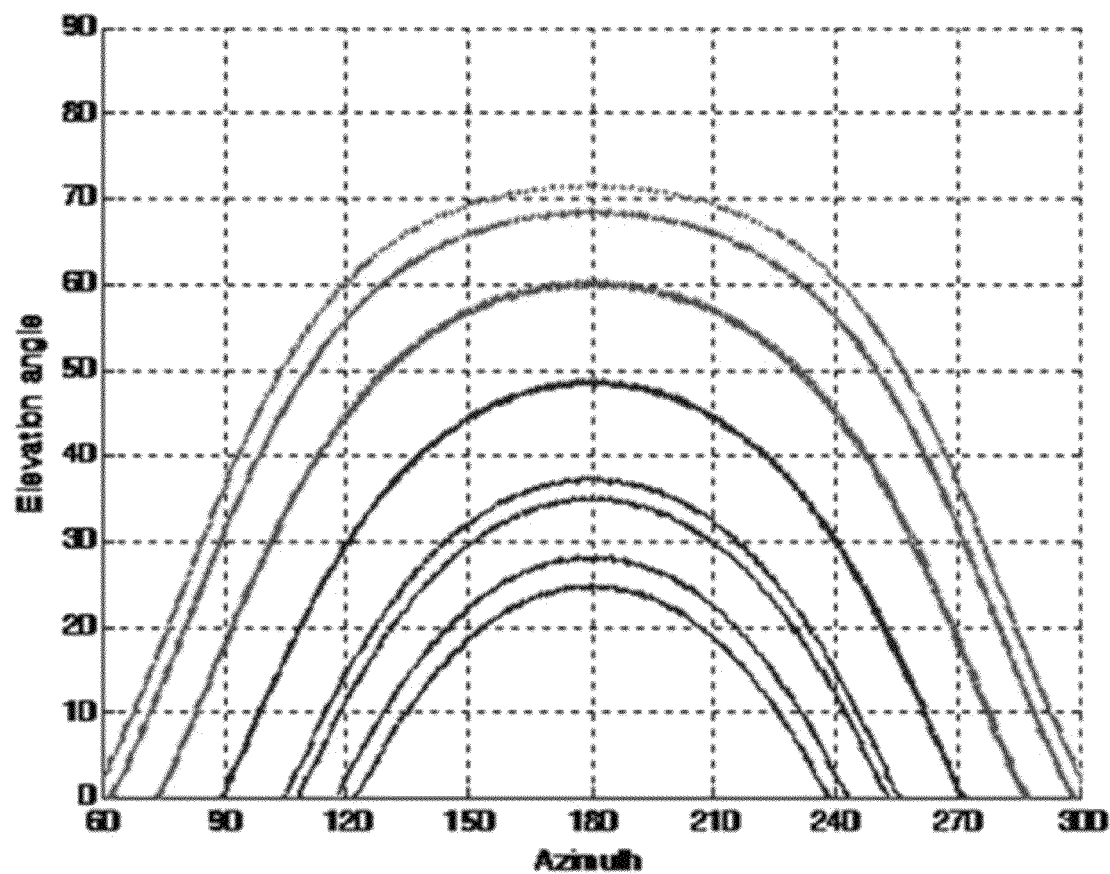
FIGS. 8A and 8B provides data showing solar azimuth and elevation angles for Chicago, Ill.
Figure 8B:
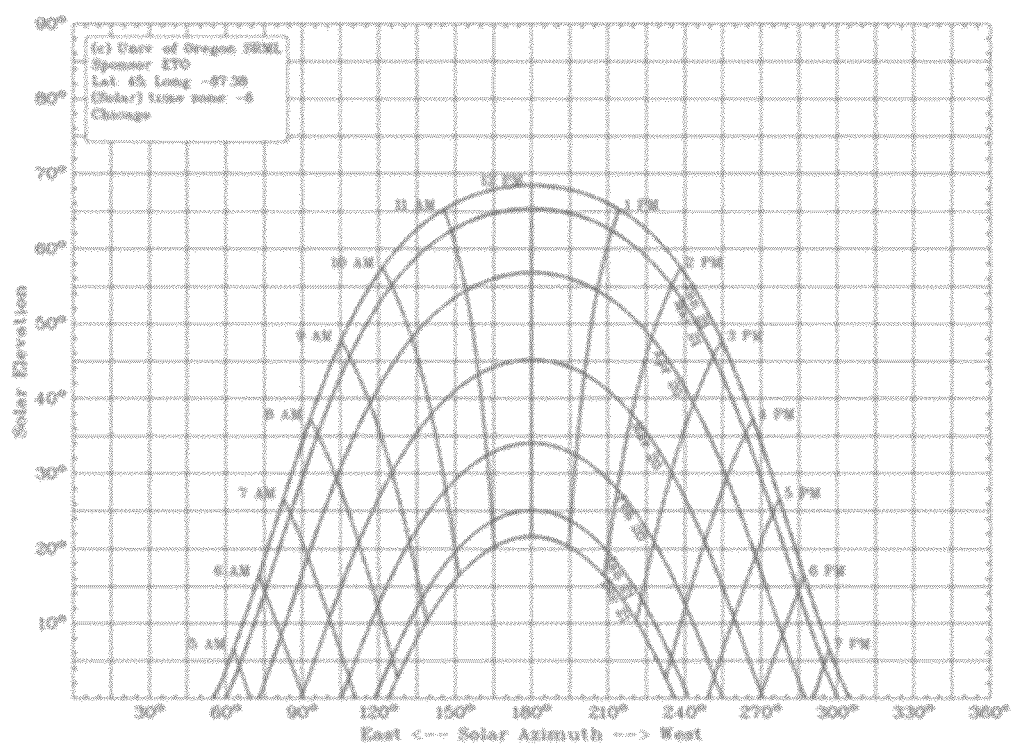

As an example, FIG. 8A shows the annual sun path chart for Chicago, Ill. from the NOAA data. The validity of the data was checked by comparing with the chart retrieved online from the University of Oregon Solar Radiation Monitoring Lab, FIG. 8B. The two match exactly. Conveniently, this allows for creation of an automated software algorithm that can control the new window system in a way that accommodates the changes to the sun's position throughout the day, every day. In addition, solar detectors attached to the window system are used as a complement to the automated software for further optimization.

Figure 9:
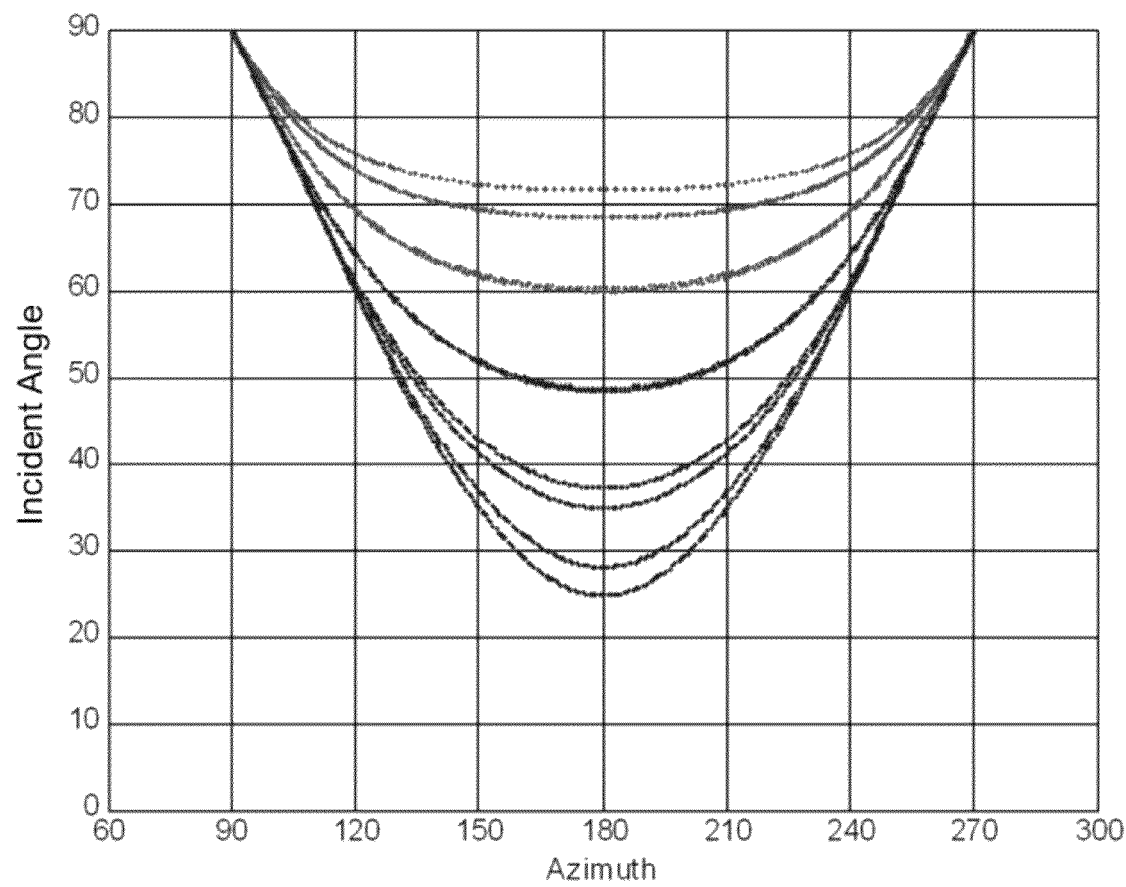
FIG. 9 provides data showing solar azimuth and incidence angles for Chicago, Ill.
Figure 10:
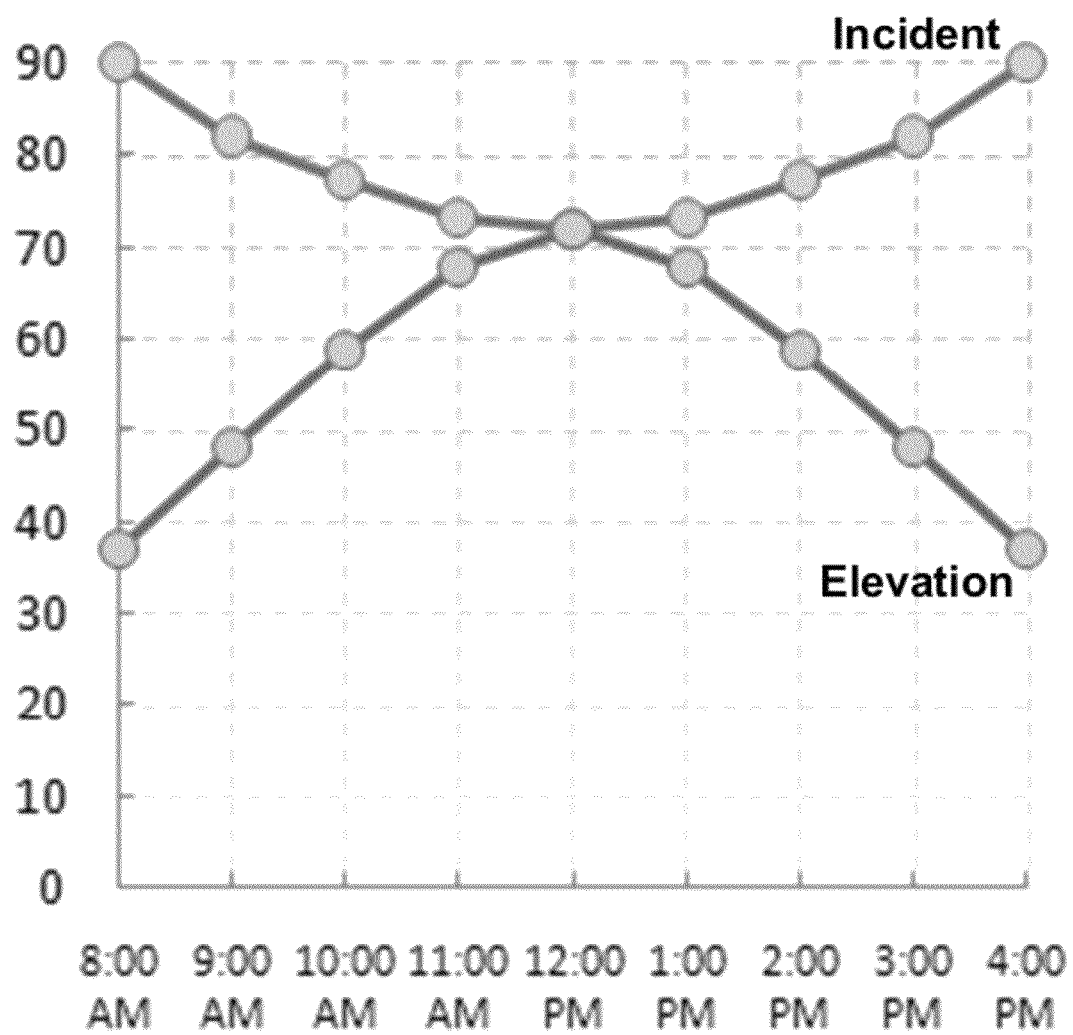
FIG. 10 provides data showing solar elevation and incidence angles for Chicago, Ill., on June 21.
Figure 11:
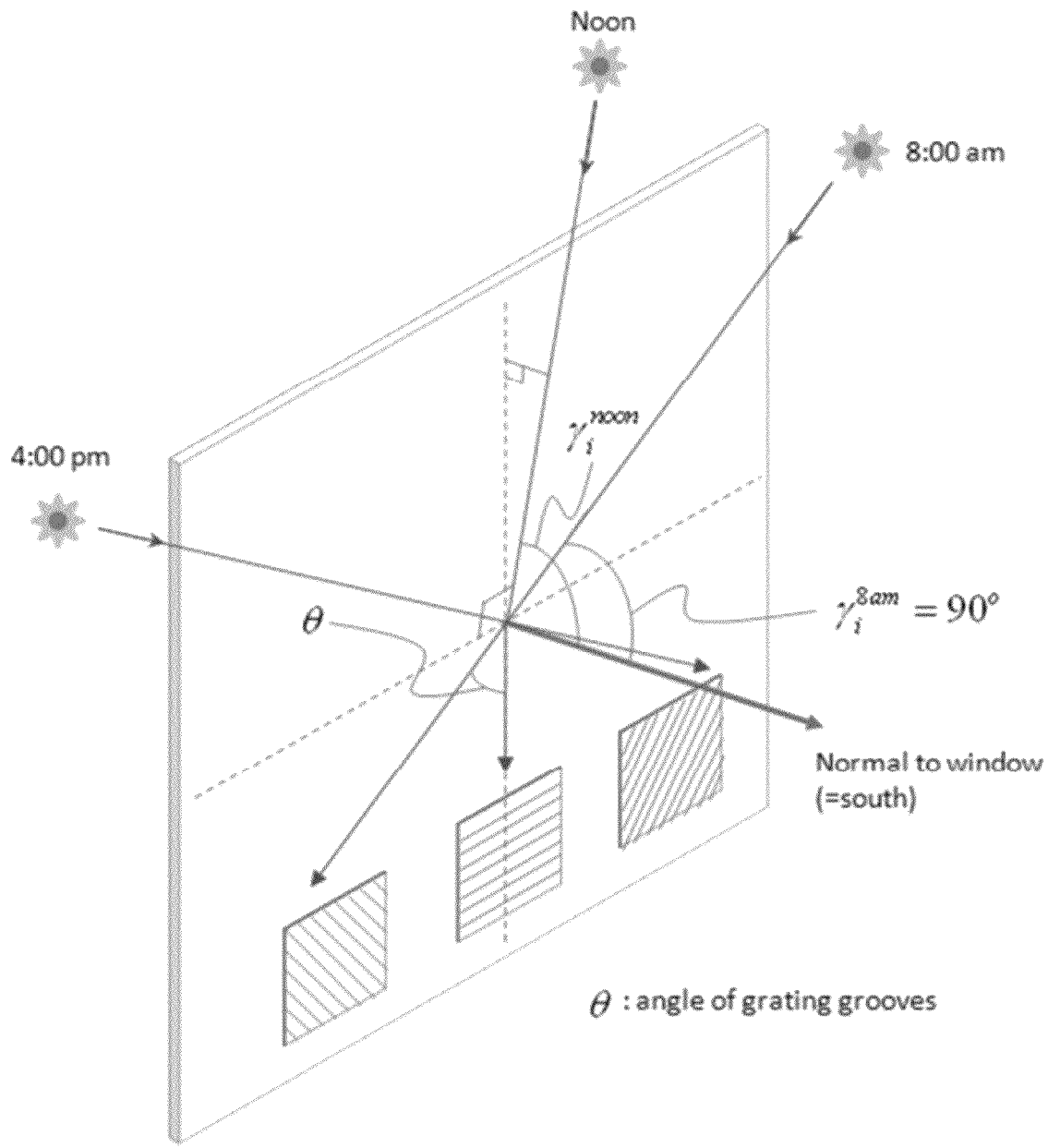
FIG. 11 provides an illustration of a dynamic smart window embodiment over the course of a day.

Using the relationship of the incident angle with the given azimuth angle and elevation angle, FIG. 9 shows the incident angle of the solar irradiance on a south-facing window located in Chicago over the whole year. FIG. 9 shows that the incident angle is lowest at noon during a day when the sun is located in south, the time when it is highest in the sky. FIG. 10 describes the incident and elevation angles on June 21 for a south-facing window located in Chicago. Note that the incident angle has a variation of only 18°, rather than 90°, during the day—this nonintuitive, but fortunate, fact makes it possible to more easily optimize and control the optical properties of the window system over a broad range of operational parameters. Taking into account the solar position variation during the day, FIG. 11 illustrates the operation of the new window system, showing the changes to the diffraction grating plane according to the Sun's position during the day.

Energy-Efficient Window at 30° and 60° Angles of Incidence.

Figure 12:
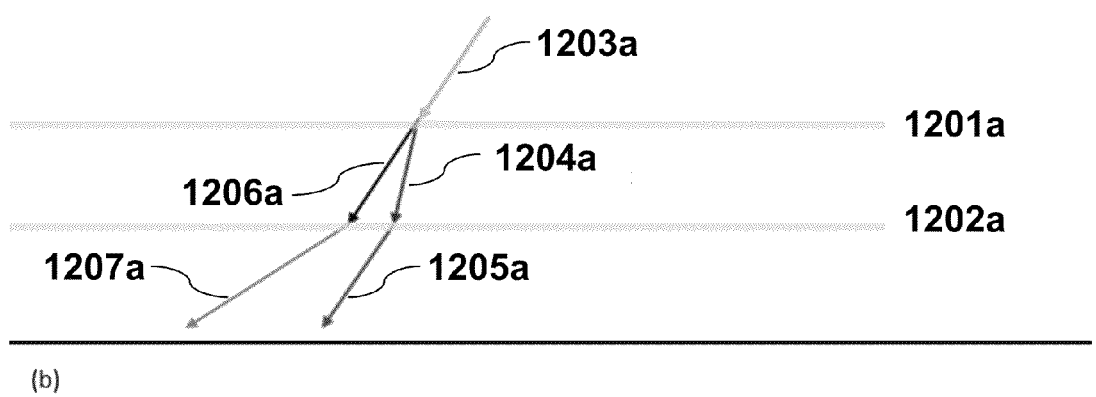
FIG. 12 provides a ray diagram of two different dual blazed grating configurations for two angles of incidence.
Figure 12:
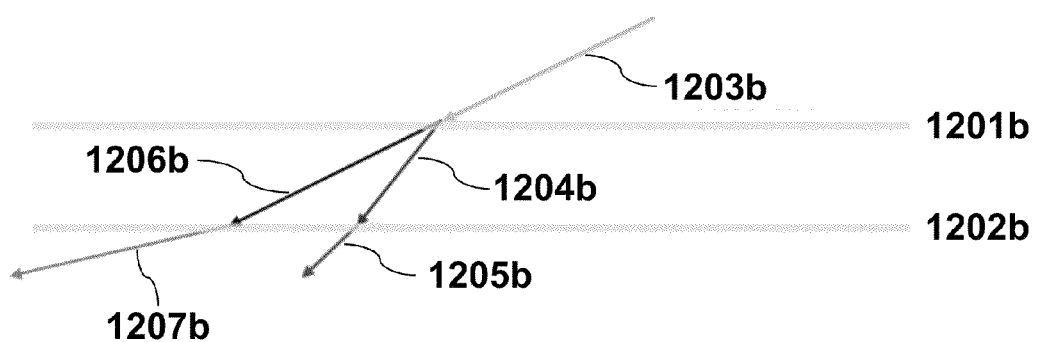

Since the angle of incidence of the solar radiation on the window changes throughout the day, the performance of the above window system for different angles has been analyzed and, as an example, the window system parameters for 30° and 60° angles of incidence have been designed. Note that both the blazed grating plane and the grating profile need to be dynamically controlled to follow the incident solar radiation. As discussed above, two gratings in series, 600 grooves/mm for VIS and 300 grooves/mm for NIR, achieved a separation angle of 17.46° at normal incidence. FIG. 12 shows a ray diagram of two gratings positioned in series at (a) 30° angle of incidence and (b) 60° angle of incidence. FIG. 12(a) shows a first diffraction grating (VIS) 1201a with a pitch of 600 grooves/mm and a blaze direction towards the right of the figure, and a second diffraction grating (NIR) 1202a with a pitch of 300 grooves/mm and a blaze direction towards the left of the figure. FIG. 12(b) shows a first diffraction grating (VIS) 1201b with a pitch of 600 grooves/mm and a blaze direction towards the right of the figure, and a second diffraction grating (NIR) 1202b with a pitch of 100 grooves/mm and a blaze direction towards the left of the figure. FIG. 12 illustrates rays indicating incidence 1203a and 1203b, $1^{st}$ diffraction of VIS 1204a and 1204b, $2^{nd}$ diffraction of VIS 1205a and 1205b, $1^{st}$ diffraction of NIR 1206a and 1206b and second diffraction of NIR 1207a and 1207b. For the case of 30° angle of incidence, the same grating configuration as that used for normal incidence performs well; in fact it yields a larger separation angle of 23.13° (between the VIS and NIR). As the angle of incidence increases to 60°, the pitch of the $2^{nd}$ grating needs to be adjusted to lower spatial frequencies for the NIR diffraction. For example, a 100 grooves/mm pitch for the $2^{nd}$ diffraction grating results in a separation angle of 33.26°, indicating that the requirement of separation of the VIS and NIR rays becomes easier for larger angles of incidence.

Experimental Demonstration.

The optical performance of a 600 grooves/mm transmission grating (grating pitch of 1.67 μm) with a blaze angle of 28.7° that was designed for the VIS spectral band was measured. The optical performance of a 300 grooves/mm grating (grating pitch of 3.33 μm) with a blaze angle of 31.7°, which was designed for NIR radiation was also measured to demonstrate the efficient separation of the VIS and NIR components as discussed above. In the measurements, the wavelengths span from 500 nm to 1500 nm by 200 nm increments; thus, the results include 500 nm and 700 nm as the VIS wavelengths and 900 nm, 1100 nm, 1300 nm and 1500 nm as the NIR wavelengths.

Figure 13:
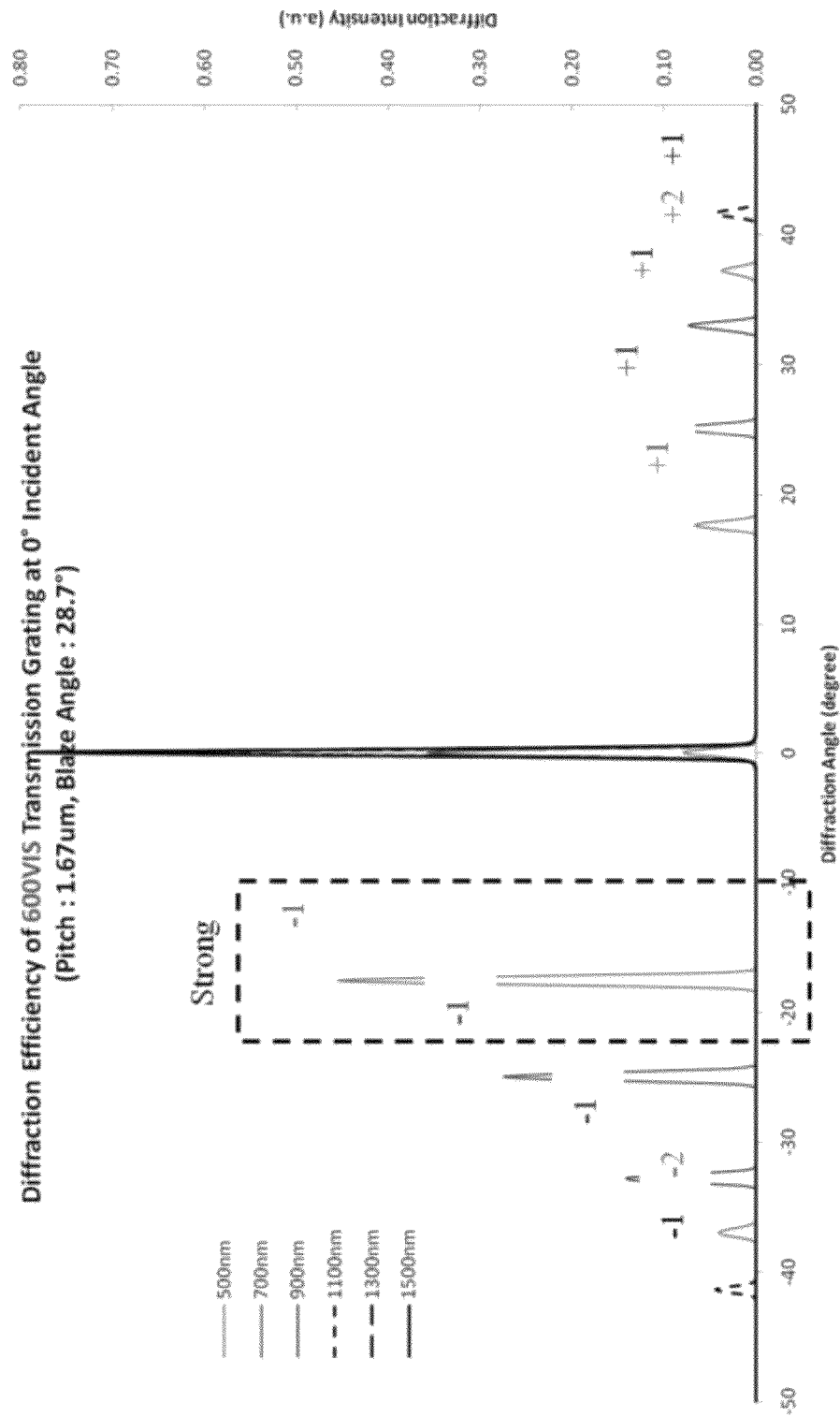
FIG. 13 provides data showing diffraction efficiency of a blazed diffraction grating optimized for diffraction of visible radiation.

FIG. 13 illustrates the distribution of the diffracted intensities in different diffraction orders as a function of diffraction angles for several wavelengths selected from VIS and NIR regions for the case of a 600 grooves/mm grating (grating pitch of 1.67 μm) with a blaze angle of 28.7° nominally designed for the VIS band. Note that the $-1^{st}$ order blazing for 500 nm wavelength occurs with the highest efficiency while the $0^{th}$ order becomes stronger as the wavelength increases into the NIR region. Therefore, as expected, most of the transmitted VIS radiation is directed toward $-1^{st}$ diffraction order while most of the NIR radiation is directed into the $0^{th}$ diffraction order.

Figure 14:
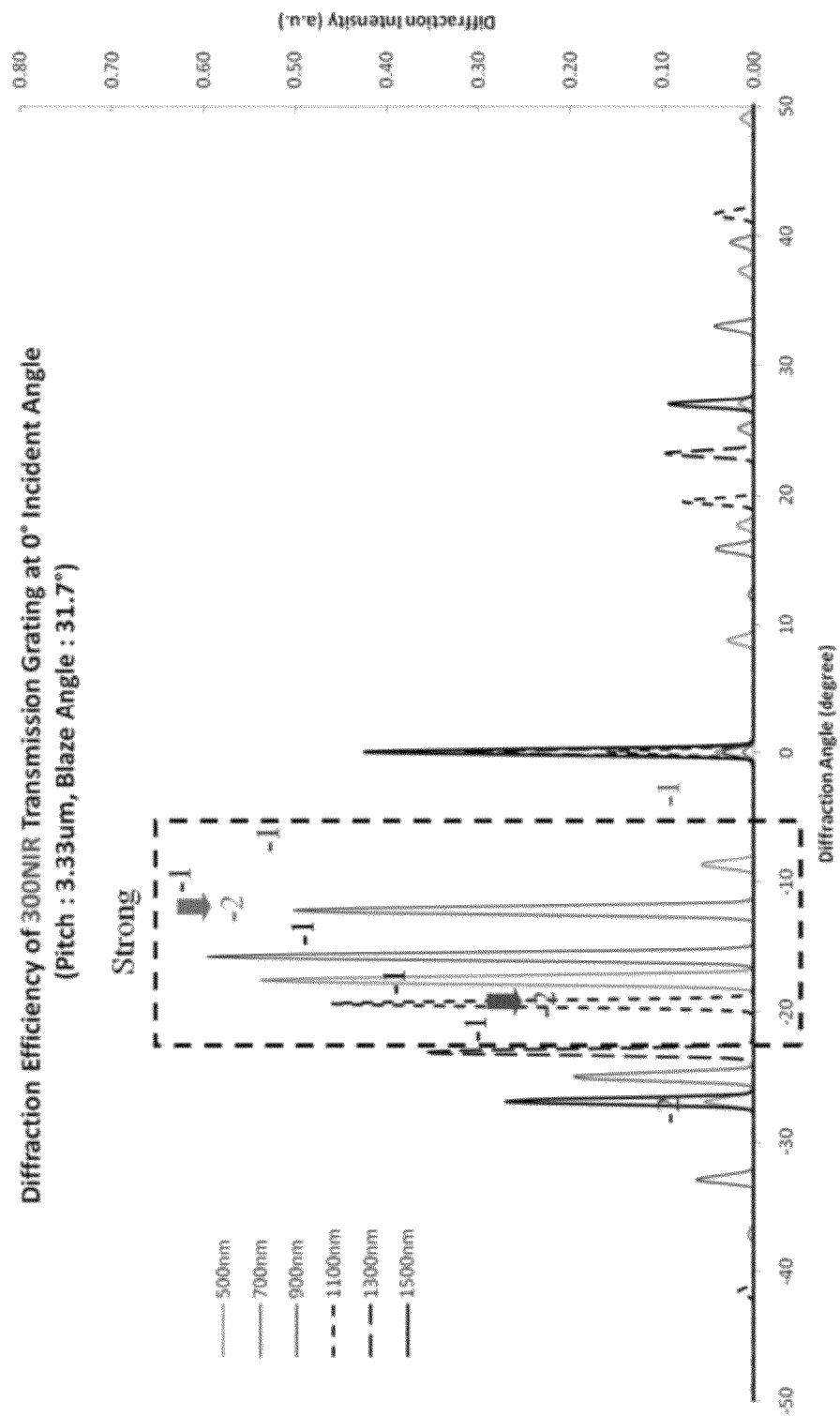
FIG. 14 provides data showing diffraction efficiency of a blazed diffraction grating optimized for diffraction of near-infrared radiation.

FIG. 14 shows the distribution of the diffracted intensities in different diffraction orders as a function of diffraction angles for several wavelengths selected from VIS and NIR spectral bands passing through a 300 grooves/mm grating (grating pitch of 3.33 μm) with a blaze angle of 31.7° and nominally designed for the NIR region. As the figure illustrates, the $-1^{st}$ order blazing occurs with the highest efficiency for 900 nm wavelength and decreases as the wavelength moves away from it but still the blazing for the NIR remains strong. However, among the strong $-1^{st}$ diffraction orders blazing in the NIR region, $-2^{nd}$ diffraction orders blazing for 500 nm wavelength and 700 nm wavelength in the VIS region also appear strong. Therefore, this grating alone is not effective in separating the NIR and VIS wavelengths.

Figure 15:
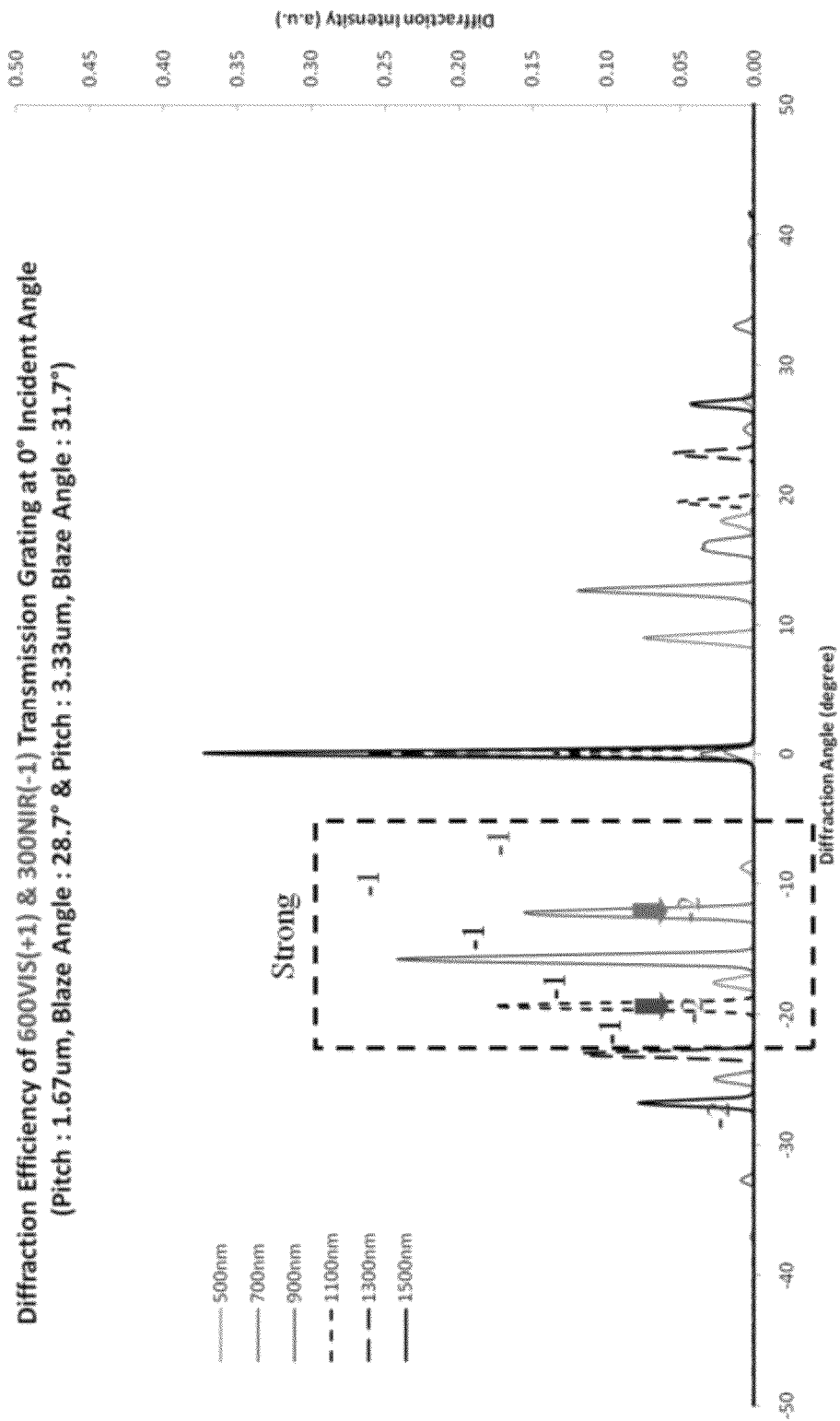
FIG. 15 provides data showing diffraction efficiency of two blazed diffraction gratings in series.

As discussed above, this obstacle is overcome by the use of two blazed diffraction gratings in series where one is blazed for the VIS region and the other is blazed for NIR region, and orienting the grooves of the two diffraction gratings such that their blaze directions are opposite to each other. FIG. 15 illustrates the distribution of the diffracted intensities in different diffraction orders as a function of diffraction angles for several wavelengths selected from VIS and NIR regions where the two gratings are positioned in series; the first grating has a pitch of 600 grooves/mm (grating pitch of 1.67 μm) and a blaze angle of 28.7° designed for VIS, and the second grating has 300 grooves/mm (grating pitch of 3.33 μm) with a blaze angle of 31.7° and designed for NIR. Here it is observed that the previously strong $-2^{nd}$ order blazing that occurred for the VIS 500 nm wavelength is now directed to the $0^{th}$ order because the first grating deflects VIS rays in the opposite direction from the second grating. Therefore, very efficient angular separation between the NIR and the VIS rays is achieved. Extensive further experiments have been carried out on the above theme, which demonstrate the broad energy-efficiency capability of the new window system.

Analytical Optical Modeling.

Detailed optical modeling of the operation of the multiple-grating system has been undertaken using both optical design software programs and detailed ray tracing algorithms. In the case of a blazed transmission diffraction grating, the highest diffraction efficiency is realized when the exit angle determined by refraction through the grating medium (as determined by Snell's law) and the exit diffraction angle (as determined by the grating equation) are identical. To ascertain that this condition is met can be determined precisely. Thus, the blaze wavelength can be analytically determined for any grating configuration by calculating both the exit refraction angle and the exit diffraction angle as a function of wavelength and then finding the wavelength for which these two exit angles are identical. In a similar manner, the ideal grating configurations can also be determined for a desired target blaze wavelength (e.g., NIR wavelengths in the 700-1500 nm range for this window system application) by varying the grating parameters to find solutions that maximize the blazing efficiency when the difference between exit refraction angle and the exit diffraction angle is negligible.

Figure 16:
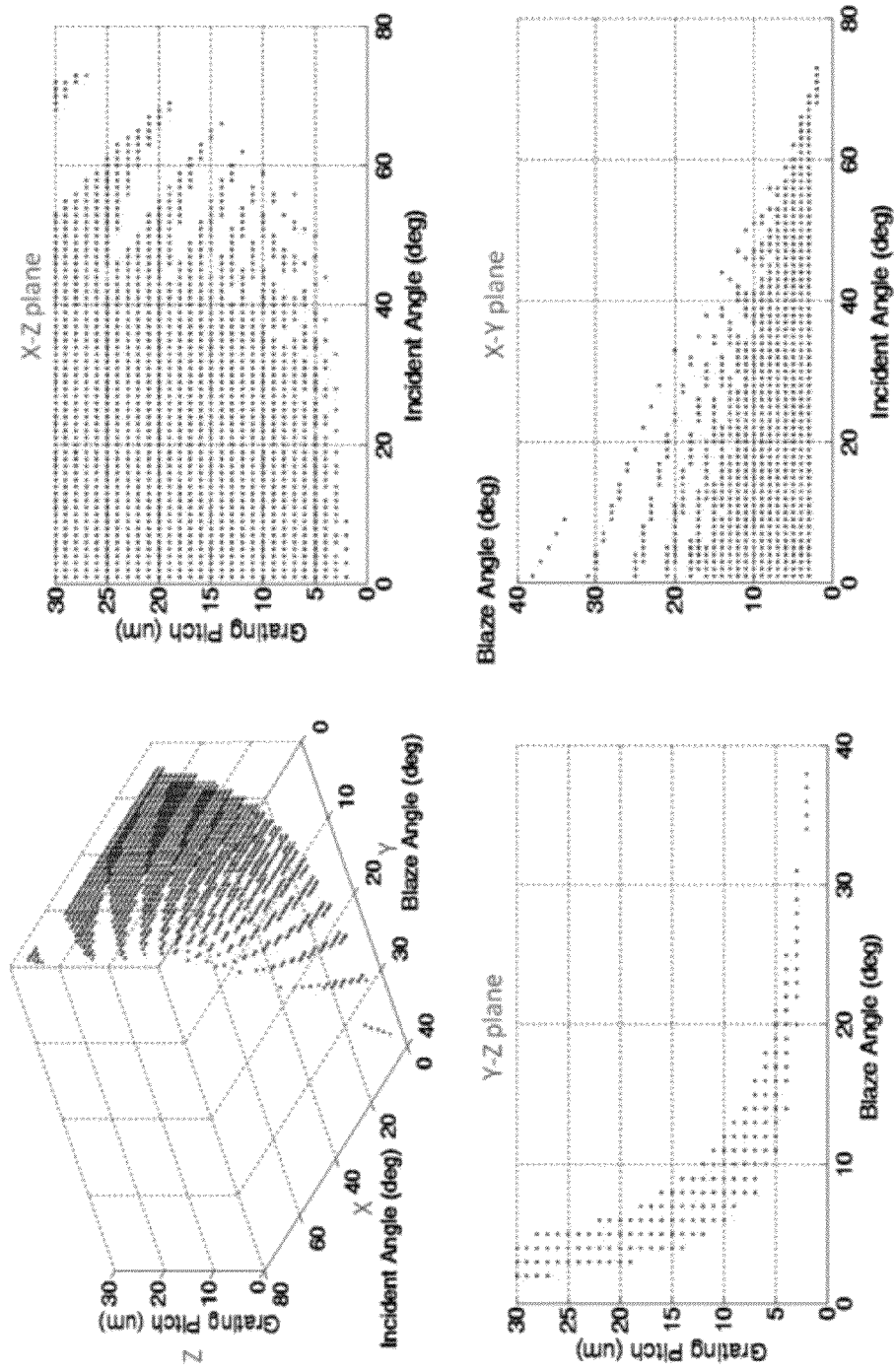
FIG. 16 provides data showing blazed grating configurations as a function of grating pitch, incident angle and blaze angle.

As an illustration of the benefits of the optical modeling capability, FIG. 16 shows multiple solutions, (i.e., blazed grating configurations) for a 1 μm target wavelength by varying each parameter by 1° increment and calculating the solutions where the difference between exit refraction angle and exit diffraction angle is less than 0.1°. Note that ideal blazed diffraction gratings suitable for a range of low to high angles of incidence can be configured by adjusting both the grating pitch and blaze angle.

Fabrication of Cost-Effective Blazed Diffraction Gratings.

The required gratings as discussed in this example can be readily fabricated with a wide range of desirable parameters at low cost. There are a number of mature fabrication processes that can be utilized for this purpose. A widely used method for fabrication of physical blazed diffraction gratings comprises first creating a master grating by using a variety of ruling engines (e.g., with diamond tips) to mechanically scribe and form the grating grooves into a plane or concave substrate coated with a thin layer of an evaporated metal. Such a ruled master grating is commonly made of nickel and is used for replicating a large number of copies in a suitable material, usually a plastic. The ruled surface of the master grating is stamped into the plastic by compression molding, which uses heat and pressure to form grooves with a good feature quality. This technique is similar to the injection compression molding technology used for mass-production of low-cost compact disks.

Semiconductor integrated circuit manufacturing technologies can also be used to create a master grating by imaging the desired surface profile onto a photoresist layer, which is then transferred into a mold by electroforming. This class of fabrication processes is especially suited for producing blazed gratings with high groove densities (e.g., >1000 grooves/mm). After the master grating is created, subsequent gratings can be replicated economically in a variety of plastics such as PMMA (polymethyl methacrylate) and polycarbonate. Fabrication costs are minimized by using precisely controlled processes to create desirable groove profiles and creating high-quality replicas from master gratings.

REFERENCES

U.S. Pat. Nos. 7,940,457, 4,639,091, 4,850,682, 4,964,701, 5,151,814, 6,014,845, 6,094,306, 6,172,792, 6,404,553, 6,587,180, 7,075,615, 7,262,899, 6,792,028, 5,566,024, 6,644,818.

U.S. Patent Application Publications 2002/0015230, 2005/0232530, 2007/0036512, 2008/0030836, 2009/0296188, 2001/0050815.

European Patent Application EP 1767964.

Lampert, C. M. (2001) "Progress in Switching Windows," Solar Switch. Mater. Proc. SPIE 4458:95-103.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

When a group of substituents is disclosed herein, it is understood that all individual members of those groups and all subgroups and classes that can be formed using the substituents are disclosed separately. When a Markush group or other grouping is used herein, all individual members of the group and all combinations and subcombinations possible of the group are intended to be individually included in the disclosure. As used herein, "and/or" means that one, all, or any combination of items in a list separated by "and/or" are included in the list; for example "1, 2 and/or 3" is equivalent to "'1' or '2' or '3' or '1 and 2' or '1 and 3' or '2 and 3' or '1, 2 and 3'".

Every formulation or combination of components described or exemplified can be used to practice the invention, unless otherwise stated. Specific names of materials are intended to be exemplary, as it is known that one of ordinary skill in the art can name the same material differently. One of ordinary skill in the art will appreciate that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A method of spatially separating visible and near-infrared electromagnetic radiation, the method comprising the steps of:

providing a first blazed diffraction grating, said first blazed diffraction grating having a first blaze direction, a first grating pitch and a first blaze angle;

providing a second blazed diffraction grating positioned in optical communication with said first blazed diffraction grating, said second blazed diffraction grating having a second blaze direction, a second grating pitch and a second blaze angle, and wherein said first grating pitch and said second grating pitch are different, wherein said first blaze angle and said second blaze angle are different and wherein said second blaze direction is oriented opposite to said first blaze direction;

passing visible electromagnetic radiation and near-infrared electromagnetic radiation through said first blazed diffraction grating, wherein at least a portion of said visible electromagnetic radiation is diffracted by said first blazed diffraction grating in a first diffraction direction and a majority of said near-infrared electromagnetic radiation is not diffracted by said first blazed diffraction grating, thereby generating diffracted visible electromagnetic radiation and non-diffracted near-infrared electromagnetic radiation;

passing said diffracted visible electromagnetic radiation and said non-diffracted near-infrared electromagnetic radiation through said second blazed diffraction grating, wherein at least a portion of said non-diffracted near-infrared electromagnetic radiation is diffracted by said second blazed diffraction grating in a second diffraction direction, thereby generating diffracted near-infrared electromagnetic radiation;

wherein said first diffraction direction is different from said second diffraction direction, thereby spatially separating said visible electromagnetic radiation and said near-infrared electromagnetic radiation.

2. The method of claim 1, wherein said first blazed diffraction grating and said second blazed diffraction grating are independently selected from the group consisting of a fixed diffraction grating and an electrically controllable diffraction grating.

3. The method of claim 1, wherein said first grating pitch is smaller than said second grating pitch.

4. The method of claim 1, wherein said first blaze angle is smaller than said second blaze angle.

5. The method of claim 1, wherein said first grating pitch is selected over the range of 1 µm to 3 µm and wherein said second grating pitch is selected over the range of 2 µm to 6 µm.

6. The method of claim 1, wherein said first blaze angle is selected over the range of 20 to 35 degrees and wherein said second blaze angle is selected over the range of 25 to 40 degrees.

7. The method of claim 1 further comprising providing a retroreflector positioned in optical communication with said second blazed diffraction grating for receiving electromagnetic radiation at least partially diffracted by said first blazed diffraction grating and at least partially diffracted by said second blazed diffraction grating.

8. The method of claim 7, wherein said retroreflector reflects near-infrared electromagnetic radiation diffracted by said second blazed diffraction grating.

9. The method of claim 1, wherein said first blazed diffraction grating is incorporated into a first window pane.

10. The method of claim 9, wherein said second blazed diffraction grating is incorporated into said first window pane.

11. The method of claim 9, wherein said second blazed diffraction grating is incorporated into a second window pane in optical communication with said first window pane.

12. The method of claim 1, wherein said first blazed diffraction grating comprises a first film on a first window pane.

13. The method of claim 12, wherein said second blazed diffraction grating comprises said second film on said first window pane.

14. The method of claim 12, wherein said second blazed diffraction grating comprises a second film on a second window pane in optical communication with said first window pane.

15. The method of claim 1, wherein a distance between said first blazed diffraction grating and said second blazed diffraction grating is selected over the range of 0 to 5 cm.

16. The method of claim 1, wherein said first blazed diffraction grating and said second blazed diffraction grating are substantially parallel.

17. The method of claim 1 further comprising providing a third blazed diffraction grating for diffracting near-infrared electromagnetic radiation, said third blazed diffraction grating having a third blaze direction, a third grating pitch and a third blaze angle, and positioning said third blazed diffraction grating in optical communication with said second blazed diffraction grating for receiving at least partially diffracted electromagnetic radiation, wherein said first grating pitch and said third grating pitch are different, wherein said first blaze angle and said third blaze angle are different and wherein said first blaze direction is oriented opposite to said third blaze direction.

18. The method of claim 17, wherein said third blaze angle is selected over the range of 25 to 40 degrees.

19. The method of claim 17, wherein said first blazed diffraction grating is optimized for diffraction of visible electromagnetic radiation and wherein said second and said third blazed diffraction gratings are optimized for diffraction of near-infrared electromagnetic radiation.

20. The method of claim 1, wherein said visible and near-infrared electromagnetic radiation is incident solar radiation.

* * * * *